(12) United States Patent
Dietze et al.

(10) Patent No.: US 10,513,634 B2
(45) Date of Patent: Dec. 24, 2019

(54) PRIMER FOR ADHESIVE TAPES

(71) Applicant: TESA SE, Norderstedt (DE)

(72) Inventors: Sebastian Dietze, Hamburg (DE); Kai Ellringmann, Hamburg (DE); Marco Kupsky, Quickborn (DE); Duc Hung Nguyen, Hamburg (DE); Uwe Schümann, Pinneberg (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 15/329,300

(22) PCT Filed: Aug. 27, 2015

(86) PCT No.: PCT/EP2015/001749
§ 371 (c)(1),
(2) Date: Jan. 26, 2017

(87) PCT Pub. No.: WO2016/030017
PCT Pub. Date: Mar. 3, 2016

(65) Prior Publication Data
US 2017/0226382 A1    Aug. 10, 2017

(30) Foreign Application Priority Data
Aug. 29, 2014   (DE) .................. 10 2014 217 245

(51) Int. Cl.
| | | |
|---|---|---|
| C09J 5/02 | (2006.01) | |
| C08K 5/057 | (2006.01) | |
| C09J 139/06 | (2006.01) | |
| C08L 23/28 | (2006.01) | |
| C08L 51/06 | (2006.01) | |
| B05D 3/02 | (2006.01) | |

(52) U.S. Cl.
CPC .............. *C09J 5/02* (2013.01); *B05D 3/0254* (2013.01); *C08K 5/057* (2013.01); *C08L 23/28* (2013.01); *C08L 51/06* (2013.01); *C09J 139/06* (2013.01); *C09J 2201/606* (2013.01); *C09J 2400/166* (2013.01); *C09J 2423/108* (2013.01); *C09J 2423/168* (2013.01); *C09J 2425/00* (2013.01); *C09J 2427/008* (2013.01); *C09J 2433/00* (2013.01); *C09J 2433/003* (2013.01); *C09J 2455/008* (2013.01); *C09J 2463/003* (2013.01)

(58) Field of Classification Search
CPC ........... C09J 5/02; C09J 139/06; C08K 5/057; C08L 51/06; C08L 23/28
See application file for complete search history.

(56) References Cited

U.S. PATENT DOCUMENTS

| | | | |
|---|---|---|---|
| 5,602,202 A | 2/1997 | Groves | |
| 2014/0113070 A1* | 4/2014 | Schumann | ............ C08L 23/283 427/208.4 |

FOREIGN PATENT DOCUMENTS

| | | |
|---|---|---|
| DE | 102011077510 A1 | 12/2012 |
| EP | 7 39 383 B1 | 10/1996 |
| EP | 8 33 865 B1 | 4/1998 |
| EP | 8 33 866 B1 | 4/1998 |
| EP | 739383 B1 * | 4/1998 |
| JP | 09-507524 A | 7/1997 |
| JP | 11-508296 A | 7/1999 |
| JP | 11-508297 A | 7/1999 |
| JP | 2008156566 A | 7/2008 |
| JP | 2014-518290 A | 7/2014 |
| KR | 10-1999-0028270 A | 4/1999 |
| KR | 10-2014-0041737 A | 4/2014 |
| WO | 95/19393 A1 | 7/1995 |
| WO | 97/00914 A1 | 1/1997 |
| WO | 97/00922 A1 | 1/1997 |
| WO | 02/100961 A1 | 12/2002 |
| WO | 03/035779 A1 | 5/2003 |
| WO | 03052021 A1 | 6/2003 |
| WO | 2008094721 A1 | 8/2008 |
| WO | WO-2012/171924 A1 * | 12/2012 |

OTHER PUBLICATIONS

J. Bielemann, "Lackadditive" (1998), section 4.3., pp. 114-129.
International Search Report dated Nov. 18, 2015, mailed Nov. 24, 2015.
English Translation of International Search Report dated Nov. 18, 2015, mailed Nov. 24, 2015.
German Search Report dated Mar. 23, 2015.
Korean Office Action dated Nov. 15, 2018, and issued in connection with Korean Patent Application No. 10-2017-7005890, and English translation.
Translation of Office Action dated Dec. 14, 2018, and issued in connection with Japanese Patent Application No. 2017-511768.

* cited by examiner

*Primary Examiner* — Peter D. Mulcahy
(74) *Attorney, Agent, or Firm* — Norris McLaughlin, P.A.

(57) ABSTRACT

Primer for adhesive tape with improved adhesion promoting properties, comprising a mixture G, which is dissolved or dispersed in one or more solvents, consisting of at least one copolymer obtained by copolymerization of a monomer mixture comprising an amount of at least 90 wt % of the following monomers: vinylcaprolactam and/or vinylpyrrolidone; one or more of the monomers a) and/or b): a) acrylic acid ester of a linear, primary alcohol having 2 to 10 carbon atoms in the alkyl group of the alcohol, b) acrylic acid ester of a branched, non-cyclic alcohol having 3 to 12 carbon atoms in the alkyl group, at least one chlorinated polyolefin, and at least one metal compound selected from the group consisting of metal acetylacetonates, metal alkoxides and alkoxy-metal acetylacetonates.

15 Claims, 1 Drawing Sheet

PRIMER FOR ADHESIVE TAPES

This is a 371 of PCT/EP2015/001749 filed 27 Aug. 2015, which claims foreign priority benefit under 35 U.S.C. 119 of German Patent Application 10 2014 217 245.4 filed Aug. 29, 2014, the entire contents of which are incorporated herein by reference.

The present invention relates to a primer composition for improving the adhesion of adhesive tapes to substrates which are difficult to bond, more particularly to olefin-based substrates such as PP/EPDM and PP, for example.

BACKGROUND OF THE INVENTION

Primers, often also called adhesion promoters, are widely known in the form of commercial products or from the technical literature. An overview of the compounds and classes of compound that can be used in primer formulations is found in J. Bielemann, Lackadditive (1998), section 4.3., pp. 114-129.

Primer compositions are disclosed in a host of patent specifications, but only a few specifications describe primers whose aim is to improve the adhesion of adhesive tapes.

Specification WO 2008/094721 A1, in connection with adhesive tape applications, proposes a primer composition based on a maleic anhydride-modified polyolefin and on an organic diamine, the aim of this composition being to improve adhesion to polyolefin-based materials.

JP 2008-156566 A, for adhesive tape applications, discloses a primer composition based on an acidic acrylate polymer and on a fluorine-containing copolymer.

For improving the adhesion of an adhesive tape to substrates coated with melamine resin, WO 02/100961 A1 proposes a primer composition which comprises a graft copolymer of an acrylate copolymer, grafted with an amino alkyl group containing terminal primary amino groups, and further comprising an acrylate copolymer having carboxyl groups in the molecular chain, and a solvent.

WO 03/052021 A1 describes a primer composition which comprises a polydiorganosiloxane-polyurea copolymer having electron-rich groups and which may have the form of a primer, an adhesive, a pressure-sensitive adhesive, or another coating material. This primer composition as well is specified in connection with adhesive tape applications.

Specifications EP 833 865 B1, EP 833 866 B1, EP 739 383 B1, and U.S. Pat. No. 5,602,202 describe primer compositions that are based on mixtures of styrene/diene block copolymers or styrene/hydrogenated diene block copolymers and selected polyacrylates, and which are intended to improve the adhesion of double-sidedly pressure-sensitive foamed adhesive tapes to both low-energy and higher-energy surfaces.

For service as a primer layer within an adhesive tape, WO 03/035779 A describes a primer composition based on a maleinized thermoplastic elastomer, an unhalogenated polyolefin, and a resin.

While the primer compositions described can be used to improve the adhesion of adhesive tapes to certain substrates, there is no known primer which in many cases improves the adhesion of adhesive tapes to particular substrates to such a significant extent that the adhesive tapes can be removed from the substrate after a bonding time of only a few minutes only at the expense of its own destruction or the destruction of the substrate.

More particularly, there is no known primer with which the effects of adhesion improvement mentioned are achieved with adhesive tapes which comprise a foamed or foamlike elastomer layer and are designed for permanent, strong bonds. Moreover, there is no known primer with which the effects of adhesion improvement mentioned are achieved both with adhesive tapes based on polyacrylates and with adhesive tapes based on blends of polyacrylates and synthetic rubber (styrene block copolymers).

It has also been found that a particular difficulty is that of achieving the adhesion-improving effects mentioned on components composed of ribbed PP/EPDM, as illustrated in FIGS. 1 and 2. Ribbed PP/EPDM is found to be more difficult to bond in practice than smooth PP/EPDM. The width of the ribs is normally about 0.8-1.0 mm, although the surfaces of the ribs are not entirely flat, and so the actual width per rib with which a flat adhesive tape is in contact is much lower. The number of ribs per cm of width is about 5 ribs in each case in standard components. Components of the type described are used frequently in the automotive industry, and there is a requirement to bond these to the ribs by means of adhesive tape applications.

Furthermore, there is no known primer with which the effect of improving the adhesion of foamed or foamlike adhesive tapes based on polyacrylates or based on blends of polyacrylates and synthetic rubber is achieved on unpretreated polypropylene in such a way that the adhesive tapes in many cases can be removed from the polypropylene after a bonding time of only a few minutes only at the expense of its own destruction. This is particularly true of adhesive tapes which are designed for permanent, strong bonds and thus have a high internal strength.

Moreover, there is no known primer with which the described effects of improving the adhesion of foamed or foamlike adhesive tapes based on polyacrylates or based on blends of polyacrylates and synthetic rubber are achieved both on the one hand on olefin-based substrates such as PP/EPDM, for example, and on the other hand on substrates such as galvanized steel, ABS and PVC.

Besides the primers described in patent specifications, there are commercial products, such as the 3M Primer 94® or 4298 UV®, for example, for improving the adhesion of adhesive tapes to substrates which are difficult to bond, more particularly both to apolar substrates such as plastics based on polypropylene/ethylene-propylene-diene monomers (PP/EPDM) and to metals such as galvanized steel. A disadvantage, however, is that these primers on ribbed PP/EPDM, especially in combination with foamed or foamlike adhesive tapes based on blends of polyacrylates and synthetic rubber, achieve the effect of improving adhesion only after a prolonged bonding time, if at all, in such a way that the adhesive tapes can be removed from the substrate only at the expense of their own destruction. Moreover, these primers in combination with the adhesive tapes mentioned, especially with adhesive tapes based on blends of polyacrylates and synthetic rubber, do not achieve any promotion of adhesion on unpretreated polypropylene in such a way that the adhesive tapes, after a bonding time of only a few minutes, can be removed from the polypropylene only at the expense of their own destruction.

A further disadvantage of all known primers is that they do not ensure adequate protection against moisture undermining and against corrosion. In the event of relatively long-term storage periods under hot and humid conditions or under extreme fluctuating conditions, such storage periods frequently being required in the automotive, electronics, and solar industries, as for example incorporating temperatures from 60° C. to 90° C. in tandem with a relative humidity of 80% to 90%, moisture undermining generally takes place. In such cases the moisture migrates either between the substrate and the primer or between the primer and the pressure-sensitive adhesive of the adhesive tape, or between both. The consequence is that the adhesion of the adhesive tape is no longer optimum and it can be unwantedly detached adhesively. Moreover, there may be unwanted corrosion, as for example the formation of zinc oxide under the bond area in the case of a galvanized steel substrate.

It is an object of the invention to provide a primer for improving the adhesion of adhesive tapes, especially of adhesive tapes which comprise a foamed or foamlike elastomer layer and are designed for permanent, strong bonds. The improvement in adhesion is to be so significant that the adhesive tapes can be removed from the substrate after a bonding time of only a few minutes only at the expense of its own destruction or the destruction of the substrate.

More particularly, the effect of improving the adhesion is to be achieved both with adhesive tapes based on polyacrylates and with adhesive tapes based on blends of polyacrylates and synthetic rubber (styrene block copolymers).

In addition, the effect of improving the adhesion is also to be achieved on components made from ribbed PP/EPDM (cf. FIGS. 1 and 2). The width of the ribs is typically about 0.8-1.0 mm, although the surfaces of the ribs are not entirely flat, and so the actual width per rib with which a flat adhesive tape is in contact is much lower. The number of ribs per cm of width is about 5 ribs in each case in standard components.

After a number of weeks of storage under hot and humid conditions or under fluctuating conditions, incorporating temperatures of 60° C. to 90° C. in conjunction with relative humidity of greater than or equal to 80% affecting the adhesive tape adhered to the primer-coated substrate, the adhesive tape is to be detachable predominantly only at the expense of its own destruction, and there are to be no instances of moisture undermining, or at least fewer such instances than is the case with the presently known primers.

SUMMARY OF THE INVENTION

The object is achieved by the subject-matter of the invention.

The invention provides, in a first and general embodiment, a primer comprising a mixture G, in dispersion or solution in one or more solvents, of
at least one copolymer obtained by copolymerizing a monomer mixture comprising the following monomers to an extent of at least 90 wt %:
vinylcaprolactam and/or vinylpyrrolidone;
one or more monomers a) and/or b):
  a) acrylic esters of a linear primary alcohol having 2 to 10 carbon atoms in the alkyl radical of the alcohol,
  b) acrylic esters of a branched acyclic alcohol having 3 to 12 carbon atoms in the alkyl radical of the alcohol,
at least one chlorinated polyolefin,
at least one metal compound selected from the group consisting of metal acetylacetonates, metal alkoxides and alkoxy metal acetylacetonates.

DETAILED DESCRIPTION

"Vinylcaprolactam" refers to N-vinylcaprolactam (CAS No. 2235-00-9) and "vinylpyrrolidone" to N-vinyl-2-pyrrolidone (CAS No. 88-12-0).

In this invention, a chlorinated polyolefin is understood to mean a polyolefin which has been chlorinated. The polyolefin may, for example, be polypropylene or polyethylene or a copolymer or a blend of polypropylene and polyethylene. The chlorinating can be effected in solvents or dispersions or by direct contact with gaseous chlorine. The CAS No. of chlorinated polypropylene is: 68442-33-1. The CAS No. of chlorinated polyethylene is: 63231-66-3.

According to the invention, a metal acetylacetonate is understood to mean a coordination compound of acetylacetonate anions and metal cations. The general formula is: $M(acac)_m$. M represents a metal cation, acac the acetylacetonate anion. The IUPAC name for acetylacetone is: pentane-2,4-dione; the CAS No. is: 123-54-6. The variable m is the number of acetylacetonate anions required to balance the charge, and depends on the oxidation state of the metal cation.

The term metal alkoxide is a synonym of "metal alcoholate". This comprises coordination compounds of the general formula: $M(OR)_n$. M here is a metal cation, OR an alcoholate anion. R is an alkyl radical. The variable n represents the number of alcoholate anions required to balance the charge, and depends on the oxidation state of the metal cation.

In this document, alkoxy metal acetylacetonates are understood to mean mixed coordination compounds composed both of acetylacetonate and of alcoholate anions and metal cations. The general formula is: $M(acac)_m(OR)_n$. M here is a metal cation, acac the acetylacetonate anion, OR an alcoholate anion. R is an alkyl radical. The variables m and n are the numbers of acetylacetonate anions and alcoholate anions respectively that are required to balance the charge, and depend on the oxidation state of the metal cation.

Primers of the invention especially have strong adhesion both on smooth PP/EPDM and on ribbed PP/EPDM on the one hand and with adhesive tapes based both on polyacrylates and on polyacrylates and synthetic rubber (styrene-block copolymers) on the other hand.

PP/EPDM is understood to mean blends (mixtures) of polypropylene and EPDM. EPDM refers to ethylene-propylene-diene rubber.

The adhesion-promoting effect of a primer of the invention sets in very rapidly. It has been found that an adhesive tape bonded to the primer layer can no longer be detached from the primer layer applied to the PP/EPDM surface without destruction even a short time after attachment, for example after about 3 minutes.

A primer for the purposes of this specification, in agreement with DIN EN ISO 4618, is a coating material for producing a prime coating. Generally speaking, a primer or coating material is applied to the surface of a substrate, after which a film is formed by evaporation of the solvent and/or by another chemical or physical curing or film-forming process, and a further, different substance, as for example a varnish, a paint, an adhesive, or an adhesive tape, can be subsequently applied to the film thus produced. Prerequisites for an adhesion-promoting effect on the part of a primer are firstly good adhesion of the primer layer to the substrate, and secondly likewise good adhesion of the further, different substance to the produced primer layer to which said other substance is to be applied. A primer has optimal adhesion-promoting action if an attempt to peel off the substance applied to the primer or the bonded product applied to the primer results in cohesive failure within the substance, the bonded product or the adhesive tape, or if this results in destruction of the substrate to which the primer has been applied beforehand. If the forces required to peel off the substance, bonded product or adhesive tape applied to the primer are higher than if no primer is used, there is an improvement in adhesion or an improvement in adhesion force. The higher these forces, the greater the improvement in adhesion or the improvement in adhesion force.

A solvent in the sense of the invention is any known liquid suitable for dissolving or at least finely dispersing the mixture disclosed in the main claim, without entering into any unwanted chemical reaction with the substances of the invention in this mixture. Preferred solvents of the invention are organic solvents, such as, for example, esters, ketones, aliphatic or aromatic hydrocarbons, and halogenated hydrocarbons. Water and other inorganic solvents are likewise included by the concept of the invention.

According to the invention, a dispersed mixture is a finely divided, homogeneous mixture. The degree of fine division and of homogeneity is not strictly defined, but must be sufficient that a coherent layer is formed after coating and that the size of the aggregates or agglomerates which are not dissolved at a molecular level is sufficiently low so as to ensure the function of the primer layer as an adhesion-promoting layer, for example.

The mixture G present in the primer of the invention comprises at least one copolymer obtained by copolymerization, preferably by free-radical copolymerization, of a monomer mixture comprising the following monomers to an extent of at least 90 wt %:
vinylcaprolactam and/or vinylpyrrolidone;
one or more of the following monomers a) and/or b):
   a) acrylic esters of a linear primary alcohol having 2 to 10 carbon atoms in the alkyl radical of the alcohol,
   b) acrylic esters of a branched acyclic alcohol having 3 to 12 carbon atoms in the alkyl radical of the alcohol.

Preferably, the at least one copolymer in the mixture G of the primer of the invention is a pressure-sensitive adhesive. More preferably, all the copolymers present in the mixture G are pressure-sensitive adhesives.

According to the invention, a pressure-sensitive adhesive (PSA), as usual within the general linguistic usage, is a substance which—in particular at room temperature—is permanently tacky and also adhesive. A characteristic of a PSA is that it can be applied to a substrate by pressure and remains adhering there, with no more detailed definition of the pressure to be applied or of the period of exposure to said pressure. In certain cases, depending on the precise nature of the PSA, on the temperature, on the atmospheric humidity, and on the substrate, a short-term, minimal pressure is sufficient, which does not go beyond a gentle contact for a brief moment, in order to obtain the adhesion effect; in other cases, a longer-term period of exposure to a high pressure may be necessary.

PSAs have particular, characteristic viscoelastic properties which give rise to the durable tack and adhesiveness. One of their characteristics is that when they are mechanically deformed, both viscous flow processes and development of elastic resilience forces occur. In terms of their respective proportion, the two processes are in a defined ratio to one another, this ratio being dependent not only on the precise composition, structure, and degree of crosslinking of the PSA, but also on the rate and duration of the deformation, and on the temperature.

The proportional viscous flow is necessary for the attainment of adhesion. Only the viscous components, produced by macromolecules with relatively high mobility, allow effective wetting and effective flow onto the substrate to be bonded. A high viscous flow component results in a high pressure-sensitive tack (also called surface tack) and hence often also in a high bond strength. Highly crosslinked systems, crystalline polymers, or polymers that have undergone glasslike solidification are generally not pressure-sensitively adhesive, or are pressure-sensitively adhesive at least only to a small extent, owing to a lack of flowable components.

The proportional elastic resilience forces are necessary in order to achieve cohesion. They are produced, for example, by very long-chain macromolecules with a high degree of entanglement, and also by physically or chemically cross-linked macromolecules, and they allow the transmission of the forces which engage upon an adhesive bond. Their result is that an adhesive bond is able to withstand sufficiently, over a relatively long period of time, a long-term load acting on it, in the form, for example, of a long-term shearing load.

For more precise description and quantification of the degree of elastic and viscous components and also of the ratio of the components to one another, it is possible to employ the variables of storage modulus (G') and loss modulus (G") that can be determined by dynamic mechanical analysis (DMA). G' is a measure of the elastic component, G" a measure of the viscous component, of a substance. Both variables are dependent on the deformation frequency and the temperature.

The variables can be determined by means of a rheometer. In that case, the material under analysis is exposed, in a plate/plate arrangement, for example, to a sinusoidally oscillating shearing stress. In the case of instruments controlled by shear rate, the deformation is measured as a function of time, and the time offset of this deformation is measured relative to the introduction of the shearing stress. This time offset is referred to as phase angle $\delta$.

The storage modulus G' is defined as follows: $G'=(\tau/\gamma) \cdot \cos(\delta)$ ($\tau$=shear stress, $\gamma$=deformation, $\delta$=phase angle=phase shift between shear stress vector and deformation vector). The definition of the loss modulus G" is: $G''=(\tau/\gamma) \cdot \sin(\delta)$ ($\tau$=shear stress, $\gamma$=deformation, $\delta$=phase angle=phase shift between shear stress vector and deformation vector).

A substance is considered generally to be pressure-sensitively adhesive, and is defined for the purposes of the invention as pressure-sensitively adhesive, if at room temperature, here by definition at 23° C., in the deformation frequency range from $10^0$ to $10^1$ rad/sec, G' is at least partly in the range from $10^3$ to $10^7$ Pa and if G" is likewise at least partly within this range. "Partly" means that at least one section of the G' plot is situated within the window formed by the deformation frequency range of $10^0$ inclusive to $10^1$ inclusive rad/sec (abscissa) and also by the range of the G' values from $10^3$ inclusive up to the $10^7$ inclusive Pa (ordinate). The same goes for G".

PSAs containing vinylcaprolactam and/or vinylpyrrolidone in the copolymer typically have only average adhesive properties. It was all the more surprising that it was found, in the context of the present invention, that a primer containing, as adhesion promoter, a copolymer of the invention having vinylcaprolactam and/or vinylpyrrolidone as monomer components has excellent adhesion-promoting properties and establishes a very firm bond of adhesive tapes to olefin-based substrates, especially PP/EPDM.

More preferably, the copolymer is a PSA, and the monomer mixture of the copolymer comprises only vinylcaprolactam and/or vinylpyrrolidone and one or more of the monomers a) and/or b), meaning that the copolymer is formed only from these monomers, and no further copolymerizable monomers are present. A primer based on such a copolymer has particularly good adhesion-promoting properties. Furthermore, it is advantageous that there is no need for the presence of other—more particularly, softening— comonomers and components beyond those specified. Thus, for example, there is no need at all for comonomers with cyclic hydrocarbon units.

Linear alkyl acid esters having 2 to 10 C atoms in the alkyl radical are ethyl acrylate, n-propyl acrylate, n-butyl acrylate, n-pentyl acrylate, n-hexyl acrylate, n-heptyl acrylate, n-octyl acrylate, n-nonyl acrylate, n-decyl acrylate. The monomer mixture preferably contains n-butyl acrylate.

Branched acyclic acrylic esters having 3 up to and including 12 carbon atoms in the alcohol alkyl radical are preferably selected from the group consisting of 2-ethylhexyl acrylate (EHA), 2-propylheptyl acrylate, isooctyl acrylate, isobutyl acrylate, isoamyl acrylate and isodecyl acrylate. More preferably, the monomers b) are selected from the group consisting of 2-ethylhexyl acrylate (EHA), 2-propylheptyl acrylate and isooctyl acrylate. "Isooctyl acrylate" refers to the acrylic esters in which the alcohol component derives from a mixture of primary isooctanols, in other words from alcohols of the kind obtainable from an isoheptane mixture by hydroformylation and subsequent hydrogenation.

Preferably, the monomer mixture of the copolymer of the primer of the invention contains at most 50 wt % and more preferably at most 40 wt % of vinylcaprolactam and/or vinylpyrrolidone, based on the total weight of the monomer mixture. Likewise preferably, the monomer mixture preferably contains at least 10 wt %, more preferably at least 20 wt % and especially at least 30 wt % of vinylcaprolactam and/or vinylpyrrolidone, based on the total weight of the monomer mixture. If vinylcaprolactam and vinylpyrrolidone are present in the monomer mixture, what is meant in each case is the content of vinylcaprolactam and vinylpyrrolidone together, i.e. the sum total.

Very preferably, the monomer mixture consists of vinylcaprolactam and/or vinylpyrrolidone and exactly one monomer of type a), a monomer a) selected with particular preference being n-butyl acrylate. A further particularly preferred monomer is vinylcaprolactam. More particularly, the monomer mixture therefore consists of vinylcaprolactam and n-butyl acrylate. In a monomer mixture of this kind, the weight ratio of vinylcaprolactam:n-butyl acrylate is preferably from 10:90 to 50:50, more preferably from 20:80 to 40:60.

According to the invention, the monomer mixture may contain up to 10 wt %, based on the total weight of the monomer mixture, of further copolymerizable monomers as well as the monomers encompassed in any case by the subject-matter of the invention. As further copolymerizable monomers of this kind, it is possible, without particular restriction, to use all of the radically polymerizable, C=C double bond-containing monomers or monomer mixtures that are known to the skilled person. By way of example, the further monomers may be selected from the group consisting of: methyl acrylate, methyl methacrylate, ethyl methacrylate, benzyl acrylate, benzyl methacrylate, phenyl acrylate, phenyl methacrylate, isobornyl acrylate, isobornyl methacrylate, tert-butylphenyl acrylate, tert-butylphenyl methacrylate, dodecyl methacrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-trimethylcyclohexyl acrylate, 3,5-dimethyladamantyl acrylate, 4-cumylphenyl methacrylate, cyanoethyl acrylate, cyanoethyl methacrylate, 4-biphenylyl acrylate, 4-biphenylyl methacrylate, 2-naphthyl acrylate, 2-naphthyl methacrylate, tetrahydrofurfuryl acrylate, maleic anhydride, hydroxyethyl acrylate, hydroxypropyl acrylate, hydroxyethyl methacrylate, hydroxypropyl methacrylate, 6-hydroxyhexyl methacrylate, allyl alcohol, glycidyl acrylate, glycidyl methacrylate, 2-butoxyethyl acrylate, 2-butoxyethyl methacrylate, methyl 3-methoxyacrylate, 3-methoxybutyl acrylate, phenoxyethyl acrylate, phenoxyethyl methacrylate, 2-phenoxyethyl methacrylate, butyl diglycol methacrylate, ethylene glycol acrylate, ethylene glycol monomethacrylate, methoxy polyethylene glycol methacrylate 350, methoxy polyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate, dimethylaminopropylacrylamide, dimethylaminopropylmethacrylamide, N-(1-methylundecyl)acrylamide, N-(n-butoxymethyl)acrylamide, N-(butoxymethyl)methacrylamide, N-(ethoxymethyl)acrylamide, N-(n-octadecyl)acrylamide, and also N,N-dialkyl-substituted amides, such as, for example, N,N-dimethylacrylamide, N,N-dimethylmethacrylamide, N-benzylacrylamide, N-isopropylacrylamide, N-tert-butylacrylamide, N-tert-octylacrylamide, N-methylolacrylamide, N-methylolmethacrylamide, acrylonitrile, methacrylonitrile, vinyl ethers, such as vinyl methyl ether, ethyl vinyl ether, vinyl isobutyl ether, vinyl esters, such as vinyl acetate, vinyl halides, such as vinyl chloride, vinylidene halides, such as vinylidene chloride, vinylpyridine, 4-vinylpyridine, N-vinylphthalimide, styrene, α- and β-methylstyrene, α-butylstyrene, 4-n-butylstyrene, 4-n-decylstyrene, 3,4-dimethoxystyrene. Macromonomers such as 2-polystyrene-ethyl methacrylate (molecular weight MW from 4000 to 13000 g/mol), poly(methyl methacrylate)ethyl methacrylate (MW from 2000 to 8000 g/mol).

The monomer mixture contains preferably at most 1 wt %, more preferably at most 0.1 wt %, based on the total weight of the monomer mixture, of acrylic acid. More particularly, the monomer mixture is free of acrylic acid.

Preferably, the concentration of the copolymer or the entirety of all the copolymers in the mixture G, based on the total weight of the primer, is from 1 wt % to 30 wt %, more preferably from 2 wt % to 20 wt %, especially from 3 wt % to 10 wt %.

Primers of the invention contain at least one chlorinated polyolefin. In this invention, a chlorinated polyolefin is understood to mean a polyolefin which has been chlorinated. The polyolefin may, for example, be polypropylene or polyethylene or a copolymer or a blend of polypropylene and polyethylene. The chlorinating can be effected in solvents or dispersions or by direct contact with gaseous chlorine. The chlorinated polyolefin may be modified in such a way that it has optionally been functionalized with an α,β-unsaturated carboxylic acid or anhydride thereof, especially with maleic anhydride, and/or with acrylic monomers in a grafting reaction which may have preceded or followed the chlorination. Chlorinated polyolefins are present in the primer of the invention preferably in a proportion of 0.1 to 10 wt %, with greater preference from 0.5 to 5 wt %, especially from 1 to 2 wt %, based in each case on the total weight of the primer.

Primers of the invention contain at least one metal compound selected from the group consisting of metal acetylacetonates, methyl alkoxides and alkoxy metal acetylacetonates. Synonyms for "alkoxy metal acetylacetonate" are metal alkoxide acetylacetonate or metal acetylacetonate alkoxide. According to the invention, the metal compound may bear further ligands without leaving the scope of the invention.

The metal is preferably selected from the group consisting of titanium, aluminium, zirconium, zinc and iron; the metal is especially titanium or zirconium. More preferably, the metal compound is selected from titanium alkoxides and zirconium alkoxides. Most preferably, the metal compound is titanium tetraisopropoxide Ti(iPr)$_4$.

In one advantageous embodiment, the primer of the invention does not contain any block copolymers of the polystyrene/polydiene or polystyrene/hydrogenated polydiene type. In the context of this specification, block copolymers of the polystyrene/polydiene or polystyrene/hydrogenated polydiene type are understood to mean all polymers having molecules composed of joined blocks of polystyrene units and polydiene units or hydrogenated or partly hydrogenated polydiene units, or containing such blocks at least in major proportions. Typical examples of polydiene units and hydrogenated or partly hydrogenated polydiene units are polybutadiene, polyisoprene, ethylene/butylene or ethylene/propylene blocks. It has been found that primers of the invention without block copolymers of the polystyrene/polydiene or polystyrene/hydrogenated polydiene type as an additional constituent bring about another improvement in adhesion of the bonded adhesive tape both on smooth and on ribbed PP/EPDM.

In one advantageous embodiment, the primer of the invention contains at least one organofunctional silane of the general structure (I)

$$(R^1O-)_xSi(R^2)_y(R^3)_z \qquad (I)$$

in which the $R^1$ radicals are each independently a $C_1$-$C_4$-alkyl radical, a $C_2$-$C_6$-alkoxyalkyl radical or an acyl radical; the $R^2$ radical is an aminoalkyl radical, a vinyl group, a methacryloyloxyalkyl radical, an isocyanatoalkyl radical, an O-methylcarbamatoalkyl radical, a glycidoxyalkyl radical or a phenyl radical;
the $R^3$ radicals are each independently a $C_1$-$C_{18}$-alkyl radical and
x=1, 2 or 3; y=0 or 1 and z=4−x−y.

Preferably, the $R^1$ radicals are each independently a methyl, ethyl, 2-methoxyethyl or acetyl radical. The $R^3$ radicals are preferably each independently a methyl, isooctyl, hexadecyl or cyclohexyl radical. The $R^2$ radical is preferably an aminoalkyl, glycidoxyalkyl, vinyl, methacryloyloxymethyl, 3-methacryloyloxypropyl or phenyl radical, especially a 3-glycidoxy-(n-)propyl or an aminoalkyl radical or a vinyl group.

More preferably, the $R^2$ radical is a glycidoxyalkyl radical and y=1. Likewise more preferably, the organofunctional silane of the general structure (I) contains an aminoalkyl radical or a vinyl group. More particularly, the organofunctional silane(s) of the general structure (I) is/are selected from the group consisting of 3-glycidoxypropyltrimethoxysilane (e.g. GENIOSIL® GF 80, from Wacker), 3-glycidoxypropyltriethoxysilane (e.g. GENIOSIL® GF 82, from Wacker), N-cyclohexylaminomethylmethyldiethoxysilane, N-cyclohexylaminomethyltriethoxysilane, N-phenylaminomethyltrimethoxysilane, N-(2-aminoethyl)-3-aminopropyltrimethoxysilane, N-cyclohexyl-3-aminopropyltrimethoxysilane, 3-aminopropyltriethoxysilane, N-(2-aminoethyl)-3-aminopropylmethyldimethoxysilane, 3-aminopropyltrimethoxysilane, vinyltrimethoxysilane, vinyldimethoxymethylsilane, vinyltriethoxysilane, vinyltris(2-methoxyethoxy)silane and vinyltriacetoxysilane.

In one advantageous embodiment of the primer of the invention, the primer further comprises one or more epoxy resins. By epoxy resins here are meant all noncrosslinked oligomers which are solid or liquid at room temperature, are soluble in suitable solvents, and carry two or more epoxide groups. Suitable epoxy resins include for example such resins based on bisphenol A and/or bisphenol F, epoxyphenol novolaks, epoxy-cresol novolaks, dicyclopentadiene-phenol novolaks, cycloaliphatic epoxy resins, and also epoxy resins containing ester groups or amino groups. The concentration of the sum of the epoxy resins in the primer is preferably not more than 12 weight percent, more preferably not more than 6 weight percent and especially not more than 3 weight percent, based on the total weight of the primer.

In another advantageous embodiment of the primer of the invention, the primer further comprises one or more styrene acrylate resins.

By styrene acrylate resins are meant all noncrosslinked resins which are solid or liquid at room temperature and are soluble in suitable solvents and are composed at least of styrene and acrylic acid, methacrylic acid, acrylic esters and/or methacrylic esters. Preferred styrene acrylate resins contain hydroxyl groups.

In another advantageous embodiment of the primer of the invention, the primer additionally comprises acetylacetone (CAS No. 123-54-6). The concentration of acetylacetone in the primer is preferably greater than 0 to 10.0 wt %. A particularly advantageous concentration is between 0.2 and 5.0 wt %. The acetylacetone is advantageously mixed into the mixture G prior to addition of the metal acetylacetonates, metal alkoxides or alkoxy metal acetylacetonates.

A primer of the invention may contain further constituents over and above the substances mentioned so far, for example additives such as other polymers, resins, plasticizers, stabilizers, rheological additives, fillers, pigments, crosslinkers, initiators, catalysts, accelerators and the like.

The primer of the invention preferably contains one or more fluorescent optical brighteners. This is advantageous because a primed substrate can be identified in this way. Without optical identification it is frequently difficult to tell a primed substrate from an unprimed substrate, since the thickness in which a primer is applied is generally very low and hence barely visible optically. One preferred fluorescent optical brightener is 2,5-thiophenediylbis(5-tert-butyl-1,3-benzoxazole), CAS No. 7128-64-5, available commercially under the trade name Tinopal OB®.

Preferably, the sum total of the proportions by weight of the mixture G and the solvents in the primer of the invention is at least 80%, with greater preference at least 85%, especially at least 90%, for example at least 92% and most preferably at least 95%.

A primer of the invention preferably contains the following components in the proportions specified, based in each case on the total weight of the primer:

| | |
|---|---|
| copolymer(s) | 2 to 9 wt % |
| solvent | 65 to 95 wt % |
| chlorinated polyolefin(s) | 0.2 to 5 wt % |
| metal compound(s) | 0.2 to 7 wt % |
| additives | 0.1 to 10 wt %, | where the proportions add up to 100 wt %.

The invention further provides for the use of a primer of the invention for production of an adhesion-promoting layer, preferably an adhesion-promoting layer in a thickness between 0.1 μm and 10 μm, more preferably an adhesion-promoting layer in a thickness between 1 μm and 5 μm.

The present invention further provides a method for producing an adhesion-promoting layer on a substrate, comprising the application of a primer of the invention to a substrate and the removal of the one or more solvents.

Primers of the invention have excellent adhesion to olefin-based substrates, especially PP/EPDM. They have strong adhesion both on smooth PP/EPDM and on ribbed PP/EPDM on the one hand and with adhesive tapes based both on polyacrylates and on polyacrylates and synthetic rubber (styrene-block copolymers) on the other hand. They are thus excellent adhesion promoters for bonds with the adhesive tapes mentioned on PP/EPDM in particular.

This improves the adhesion of adhesive tapes so significantly that the adhesive tapes can be removed from the substrate after a bonding time of only a few minutes only at the expense of their own destruction or the destruction of the substrate.

These effects of improving adhesion are achieved especially with adhesive tapes which contain a foamed or foamlike elastomer layer and are designed for permanent, strong bonds.

BRIEF DESCRIPTION OF THE DRAWINGS

In FIG. 2, the numerals mean:
1 ribbed PP/EPDM substrate
2 adhesive tape bonded in longitudinal direction.

Figure 1:
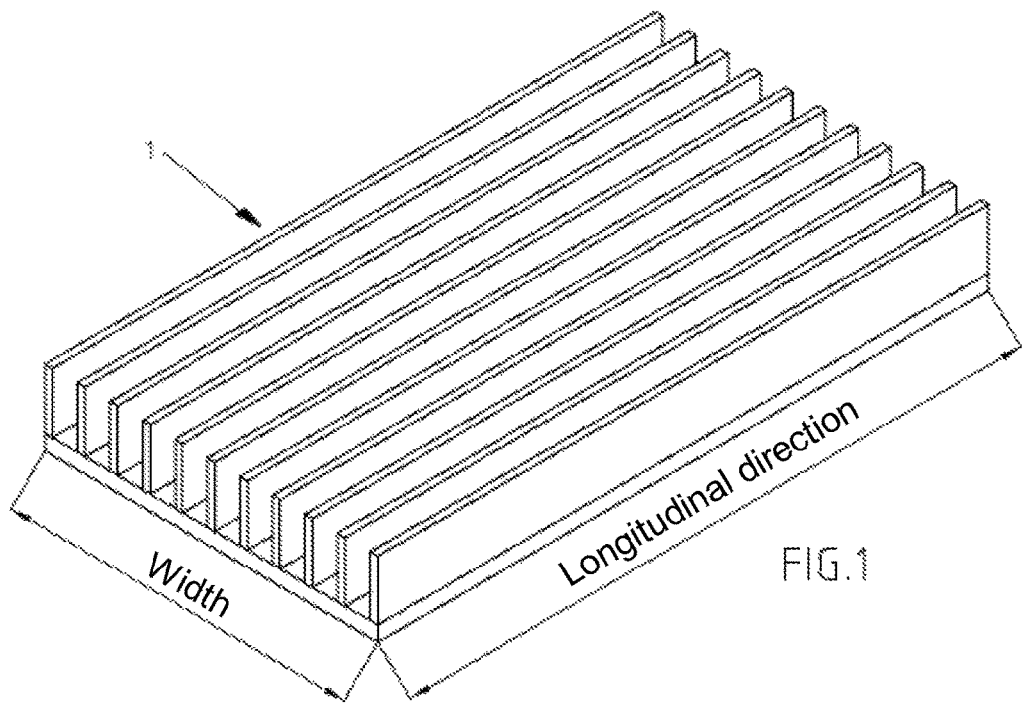
FIG. 1 illustrates a ribbed PP/EPDM

In practice, ribbed PP/EPDM is found to be much more difficult to bond than smooth PP/EPDM. The width of the ribs is about 0.8-1.0 mm, although the surfaces of the ribs are not entirely flat, and so the actual width per rib with which a flat adhesive tape is in contact is much lower. The number of ribs per cm of width is about 5 ribs in each case in standard components. Components of the type described are used frequently in the automotive industry, and there is a requirement to bond these to the ribs by means of adhesive tape applications. This can be achieved by promotion of adhesion with the primers of the invention.

In one advantageous embodiment, the described effect of improving the adhesion of foamed or foamlike adhesive tapes based on polyacrylates or based on blends of polyacrylates and synthetic rubber can also be achieved on unpretreated polypropylene (PP) in such a way that the adhesive tapes can be removed from the polypropylene after a bonding time of only a few minutes only at the expense of the destruction of the polypropylene itself. This is especially true of adhesive tapes which are designed for permanent, strong bonds and thus have a high internal strength.

In one advantageous embodiment, the described effect of improving the adhesion of foamed or foamlike adhesive tapes based on polyacrylates or based on blends of polyacrylates and synthetic rubber can be achieved both on the one hand on olefin-based substrates such as PP/EPDM, for example, and on the other hand on substrates such as galvanized steel, PP, ABS and PVC.

The primers of the invention additionally assure good protection against moisture undermining and against corrosion. In the event of relatively long-term storage periods under hot and humid conditions or under extreme fluctuating conditions, such storage periods frequently being required in the automotive, electronics, and solar industries, as for example incorporating temperatures from 60° C. to 90° C. in tandem with a relative humidity of 80% to 90%, moisture undermining generally takes place. In such cases the moisture migrates either between the substrate and the primer or between the primer and the pressure-sensitive adhesive of the adhesive tape, or between both. The consequence is that the adhesion of the adhesive tape is no longer optimum and it can be unwantedly detached adhesively. Moreover, there may be unwanted corrosion, as for example the formation of zinc oxide under the bond area in the case of a galvanized steel substrate. These unwanted phenomena are prevented or at least distinctly attenuated with the primers of the invention.

After a number of weeks of storage under hot and humid conditions or under fluctuating conditions, incorporating temperatures of 60° C. to 90° C. in conjunction with relative humidity of greater than or equal to 80% affecting the adhesive tape which is based on polyacrylates or based on blends of polyacrylates and synthetic rubber and has been adhered to the primer-coated substrate, this adhesive tape is detachable predominantly only at the expense of its own destruction, and there is no moisture undermining, or at least a lesser degree of moisture undermining than is the case with the presently known primers.

The production of an adhesion-promoting layer with the primer of the invention is effected in a known manner, mainly by first applying the primer to a substrate. Subsequently, the solvent(s) is/are allowed to evaporate, and then the adhesive tape can be applied. There may only be a few minutes between application/evaporation of the solvent and the application of the adhesive tape, or else a few days or weeks.

The invention further provides for the use of the primer of the invention for improving the adhesion of adhesive tapes, especially of adhesive tapes based on polyacrylates or based on blends of polyacrylates and synthetic rubber (styrene block copolymers), on olefin-based substrates, especially on PP/EPDM and PP, more preferably on PP/EPDM; and on galvanized steel, ABS and PVC; more preferably on olefin-based substrates, especially on PP/EPDM and PP, most preferably on PP/EPDM.

EXAMPLES

The test methods below were used to provide brief characterization of the specimens produced in accordance with the invention:
Dynamic Mechanical Analysis (DMA) for Determining the Storage Modulus G' and the Loss Modulus G"

The pressure-sensitive tack of the copolymers present in the primer was characterized by determination of the storage modulus G' and loss modulus G" by means of dynamic mechanical analysis (DMA).

The measurements were made using the DSR 200 N shear stress-controlled rheometer from Rheometric Scientific in an oscillation test with a sinusoidally oscillating shearing stress in a plate/plate arrangement. The storage modulus G' and the loss modulus G" were determined in a frequency sweep from $10^{-1}$ to $10^2$ rad/sec at a temperature of 23° C. G' and G" are defined as follows:

$$G' = \tau/\gamma \cdot \cos(\delta)$$

($\tau$=shear stress, $\gamma$=deformation, $\delta$=phase angle=phase shift between shear stress vector and deformation vector).

$$G'' = \tau/\gamma \cdot \sin(\delta)$$

(τ=shear stress, γ=deformation, δ=phase angle=phase shift between shear stress vector and deformation vector).

The definition for the angular frequency is as follows: ω=2π*f (f=frequency). The unit is rad/sec.

The thickness of the pressure-sensitive copolymer samples measured was always between 0.9 and 1.1 mm (1+/−0.1 mm). The pressure-sensitive copolymer samples were produced by coating out the copolymers described later on below on a double-sidedly siliconized polyester film (release liner), evaporating the solvent at 70° C., and piling up the resulting 100 µm coats on one another until a thickness of about 1 mm was reached. Subsequently, the samples to be analysed were punched out. The sample diameter was 25 mm in each case. Preliminary tension was applied with a load of 3N. For all of the measurements, the stress of the sample specimens was 2500 Pa.

Bond Strength

The bond strength was determined in accordance with PSTC-101 at room temperature. In line with this method, the primer was first applied thinly to the substrate. This was done by brush application of the primer to the substrate. Following evaporation of the solvent, the adhesive strip under measurement (the adhesive tape) was applied (adhered) to the substrate now bearing the primer in a layer thickness of approximately 1 µm to 10 µm. To effect this application, a strip of the adhesive tape in a defined width (standard: 20 mm) was bonded to the primer-coated substrate by rolling over it five times with a 5 kg steel roller.

The time between the last rolling of the adhesive tape and the peel removal was as follows: a) 3 minutes; b) 30 minutes. The peel angle was 900 in each case and the peel rate 300 mm/min. The force required for peel removal is the bond strength, which is reported in the unit N/cm and thus relates to a standardized adhesive tape width of 1 cm. Alongside the bond strength, the nature of adhesive bond failure was ascertained. The adhesive strips measured were reinforced on the reverse with a polyester film that was 23 µm thick and had undergone incipient etching with trichloroacetic acid. All measurements were conducted in a controlled-climate space at 23° C. and 50% relative humidity.

Conditioned Storage

The assemblies comprising the substrate coated with the primer of the invention and the adhesive tape adhered to that substrate were subjected to storage under selected climatic conditions, in order to determine the climatic robustness of the bond.

Storage a): two-week storage under conditions of 85° C. and 85% relative humidity Storage b): two-week cycled storage with cycles of 4 hours −40° C., 4 hours heating/cooling, 4 hours 80° C./80% relative humidity.

After the end of the storage period, the samples, which were reinforced on the reverse with a polyester film having a thickness of 23 µm thick and having been incipiently etched with trichloroacetic acid, were subjected to the bond strength test with a peel angle of 90° in each case and with a peel rate of 300 mm/min, in a controlled-climatic space at 23° C. and 50% relative humidity.

Static Glass Transition Temperature

The static glass transition temperature was determined via dynamic scanning calorimetry in accordance with DIN 53765. The figures for the glass transition temperature $T_g$ refer to the glass transformation temperature value $T_g$ in accordance with DIN 53765:1994-03, unless indicated otherwise in any specific case. Heating curves run with a heating rate of 10 K/min. The specimens are measured in Al crucibles with a perforated lid under a nitrogen atmosphere. Evaluation takes place on the second heating curve. A glass transition temperature is evident as an inflection point on the thermogram.

Molecular Weights

The average molecular weight Mw and the average molecular weight $M_N$, and the polydispersity D, were determined by means of gel permeation chromatography (GPC). The eluent used was THF with 0.1 vol % of trifluoroacetic acid. Measurement took place at 25° C. The precolumn used was a PSS-SDV, 5 µm, $10^3$ Å ($10^{-7}$ m), ID 8.0 mm×50 mm. Separation took place using the columns PSS-SDV, 5 µm, $10^3$ Å, ($10^{-7}$ m), $10^5$ Å ($10^{-5}$ m), and $10^6$ Å ($10^{-4}$ m), each with ID 8.0 mm×300 mm. The sample concentration was 4 g/l, the flow rate 1.0 ml per minute. Measurement took place against PMMA standards.

Solids Content

The solids content is a measure of the fraction of unvaporizable constituents in a polymer solution. It is determined gravimetrically, with the solution being weighed, the vaporizable fractions then being evaporated off in a drying cabinet at 120° C. for 2 hours, and the residue being weighed again.

K Value (Fikentscher)

The K value is a measure of the average molecular size of high-polymer compounds. For the measurement, one percent strength (1 g/100 ml) toluenic polymer solutions were prepared and their kinematic viscosities were determined by means of a VOGEL-OSSAG viscometer. Standardization to the viscosity of toluene gives the relative viscosity, from which the K value can be calculated by the method of Fikentscher (Polymer 8/1967, 381 ff.).

Figure 2:
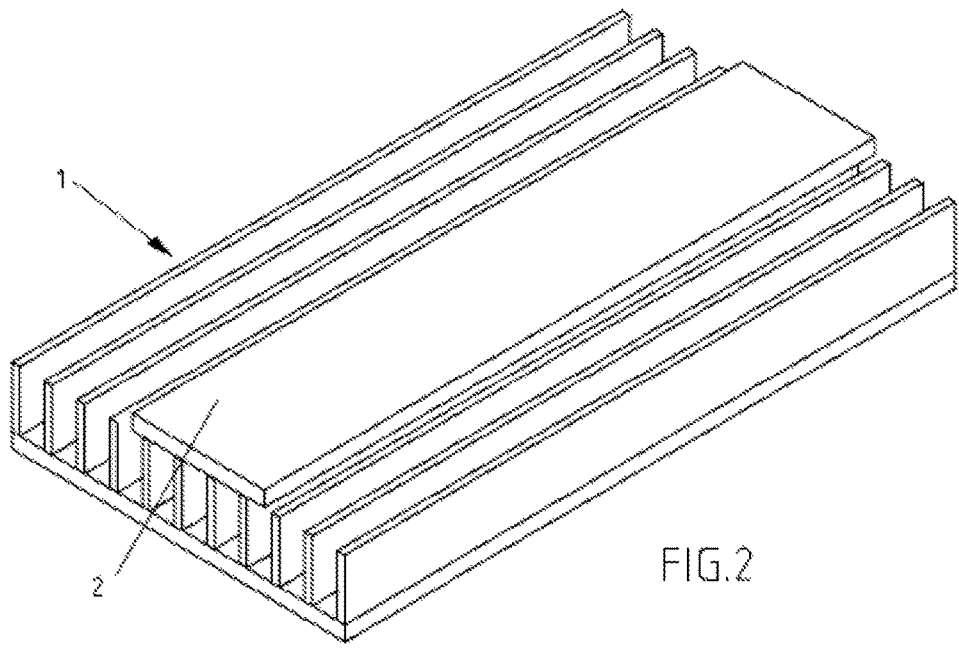
FIG. 2 illustrates the application of an adhesive tape to a ribbed PP/EPDM SUBSTRATE Ribbed PP/EPDM (FIG. 1) and an application of adhesive tape thereto (FIG. 2) are shown for illustration in FIGS. 1 and 2.

The substrates used (to which the primer was applied first of all in a thin layer, i.e. in a layer thickness after the vaporization of the solvent of 1 to 10 µm, followed by the adhesive tape being adhered thereto) were as follows:

Substrate 1: PP/EPDM, designation: HX TRC 135X/4 Black, PP/EPDM=blend of polypropylene and EPDM; EPDM=ethylene-propylene-diene rubber, smooth surface, from Basell Bayreuth Chemie GmbH Substrate 2: VW installable part made from PP/EPDM, designation: VW, TKS, PP-EPDM-MD30, 5NO.854.940.A, complex-shaped component having a partly ribbed surface Substrate 3: VW installable part made from PP/EPDM, designation: VW, PP-EPDM T10, 2K3 853 535 HL MAXI, complex-shaped component having a partly ribbed surface Substrate 4: VW installable part made from PP/EPDM, designation: VW, TKS, PP-EPDM-MD30, 1TO.853.718.A, complex-shaped component having a partly ribbed surface Substrate 5: PP (polypropylene) test specimen, smooth surface, from Rocholl GmbH, Substrate 6: test specimen made from hot-dip-galvanized galvanized steel (composed of DX51 D+Z275), smooth surface, from Rocholl GmbH Substrate 7: test specimen made from ABS (acrylonitrile-butadiene-styrene copolymer), smooth surface, from Rocholl GmbH Substrate 8: test specimen made from PVC (polyvinyl chloride), smooth surface, from Rocholl GmbH In the case of the complex-shaped installable parts (substrates 2 to 4) having a partly ribbed surface, bonding was always effected in the ribbed part in longitudinal direction, as shown in FIGS. 1 and 2. The primer was first applied thinly to the ribs prior to the adhering of the adhesive tape, as described above. The individual ribs each had a width of about 0.8 to 1 mm, although the surfaces of the ribs were not entirely flat, and so the actual width per rib with which a flat adhesive tape is in contact was much lower. The number of ribs per cm of width was about 5 ribs in each case. The adhesive forces reported are based here too on the standardized adhesive tape width of 1 cm and not on the widths of the individual ribs added up to 1 cm.

The adhesive tapes (test adhesive tapes) with which the primer was tested were based on pressure-sensitive polyacrylate adhesives and pressure-sensitive adhesives based on an acrylate/synthetic rubber mixture.

These pressure-sensitive adhesives were produced using the following raw materials:

| Chemical compound | Trade name | Manufacturer or supplier | CAS No. |
|---|---|---|---|
| Bis(4-tert-butylcyclohexyl) peroxydicarbonate | Perkadox 16 | Akzo Nobel | 15520-11-3 |
| 2,2'-Azobis(2-methylpropionitrile), AIBN | Vazo 64 | DuPont | 78-67-1 |
| 2,2'-Azobis(2-methylbutyronitrile) | Vazo 67 | DuPont | 13472-08-7 |
| Pentaerythritol tetraglycidyl ether | Polypox R16 | UPPC AG | 3126-63-4 |
| 3,4-Epoxycyclohexylmethyl 3,4-epoxycyclohexanecarboxylate | Uvacure 1500 | Cytec Industries Inc. | 2386-87-0 |
| Triethylenetetramine | Epikure 925 | Hexion Speciality Chemicals | 112-24-3 |
| Microballoons (MB) (dry unexpanded microspheres, diameter 9 to 15 µm, expansion onset temperature 106 to 111° C., TMA density ≤25 kg/m$^3$) | Expancel 051 DU 40 | Expancel Nobel Industries | |
| Terpene-phenolic resin (softening point 110° C.; $M_w$ = 500 to 800 g/mol) | Dertophene T110 | DRT resins | 25359-84-6 |
| Terpene-phenolic resin (softening point 105° C.; $M_w$ = 500 to 800 g/mol) | Dertophene T105 | DRT resins | 25359-84-6 |
| n-Butyl acrylate | n-Butyl acrylate | Rohm & Haas | 141-32-2 |
| Acrylic acid | Glacial acrylic acid | BASF | 79-10-7 |
| 2-Ethylhexyl acrylate | | Brenntag | 103-11-7 |
| Methyl acrylate | | BASF | 96-33-3 |
| Styrene-butadiene block copolymer (polystyrene content about 31%) | Kraton D1118 | Kraton Polymers | 9003-55-8 |
| Polyoxyethylene(15)cocoamine | Ethomeen C/25 | Akzo Nobel | 61791-14-8 |
| Reofos RDP | Tetraphenyl-resorcinol bis(diphenyl-phosphate) | Chemtura | 57583-54-7 |

The expansion capacity of the microballoons can be described through the determination of the TMA (thermo mechanical analysis) density [kg/m$^3$] (Stare Thermal Analysis System from Mettler Toledo; heating rate 20° C./min). The TMA density here is the minimum achievable density at a defined temperature $T_{max}$ under atmospheric pressure before the microballoons collapse.

The softening point of the resins is determined in accordance with DIN ISO 4625.

Furthermore, the following solvents were used for preparing the polyacrylate PSAs contained in the test adhesive tapes:

| Designation | CAS No. | Manufacturer |
|---|---|---|
| 60/95 special-boiling-point spirit or naphtha (crude oil), hydrogen-treated, light | 64742-49-0 | Shell, Exxon |
| Acetone | 67-64-1 | Shell |
| Isopropanol | 67-63-0 | Shell |

Test Adhesive Tape 1 (Single-Layer Acrylate Adhesive Tape)

An example polyacrylate PSA 1 for producing the test adhesive tape 1 was prepared as follows: A reactor conventional for radical polymerizations was charged with 54.4 kg of 2-ethylhexyl acrylate, 20.0 kg of methyl acrylate, 5.6 kg of acrylic acid, and 53.3 kg of acetone/isopropanol (94:6). After nitrogen gas had been passed through the reactor for 45 minutes, with stirring, the reactor was heated to 58° C. and 40 g of Vazo 67, in solution in 400 g of acetone, were added. Thereafter the external heating bath was heated to 75° C. and the reaction was carried out constantly at this external temperature. After one hour a further 40 g of Vazo 67, in solution in 400 g of acetone, were added, and after four hours the batch was diluted with 10 kg of acetone/isopropanol mixture (94:6).

After five hours and again after seven hours, initiation was repeated with 120 g each time of bis(4-tert-butylcyclohexyl) peroxydicarbonate, in each case in solution in 400 g of acetone. After a reaction time of 22 hours, the polymerization was discontinued and the batch was cooled to room temperature. The product had a solids content of 55.9% and was freed from the solvent in a concentrating extruder under reduced pressure (residual solvent content≤0.3 mass percent). The resulting polyacrylate had a K value of 58.8, an average molecular weight of Mw=746 000 g/mol, a polydispersity of D (Mw/Mn)=8.9, and a static glass transition temperature of $T_g$=−35.6° C.

This base polymer was melted in a feeder-extruder (single-screw conveying extruder from TROESTER GmbH & Co. Kg, Germany) and in the form of a polymer melt was conveyed with said extruder, via a heatable hose, into a planetary roller extruder from Entex (Bochum). The melted resin Dertophene T 110 was then added via a metering port, to give the melt a resin concentration of 28.3 mass percent. Additionally, the crosslinker Polypox R16 was added. Its concentration in the melt was 0.14 mass percent. All components were mixed to give a homogeneous polymer melt.

Using a melt pump and a heatable hose, the polymer melt was transferred to a twin-screw extruder (from Berstorff). There the accelerator Epikure 925 was added. Its concentration in the melt was 0.14 mass percent. The entire polymer mixture was then freed from all gas inclusions in a vacuum dome under a pressure of 175 mbar. After the vacuum zone, the microballoons were metered in and were incorporated homogeneously into the polymer mixture by means of a mixing element. Their concentration in the melt was 0.7 mass percent. The resulting melt mixture was transferred into a die.

Following exit from the die, in other words after a drop in pressure, the incorporated microballoons underwent expansion, with the drop in pressure producing shear-free cooling of the polymer composition. This gave a foamed polyacrylate PSA, which was subsequently shaped to web form in a thickness of 0.8 mm by means of a roll calender, and was lined with a double-sidedly siliconized release film (50 µm, polyester), while the chemical crosslinking reaction proceeded. After winding, the film was stored at room temperature for four weeks before being used further for primer testing. The wound film is test adhesive tape 1.

Test Adhesive Tape 2 (Three-Layer Acrylate Adhesive Tape)

An example polyacrylate PSA 2A for producing the test adhesive tape 2 was prepared as follows:

A reactor conventional for radical polymerizations was charged with 30.0 kg of 2-ethylhexyl acrylate, 67.0 kg of butyl acrylate, 3.0 kg of acrylic acid, and 66.7 kg of acetone/isopropanol (96:4). After nitrogen gas had been passed through the reactor for 45 minutes, with stirring, the reactor was heated to 58° C. and 50 g of Vazo 67, in solution in 500 g of acetone, were added. Thereafter the external heating bath was heated to 70° C. and the reaction was carried out constantly at this external temperature. After one hour a further 50 g of Vazo 67, in solution in 500 g of acetone, were added, and after two hours the batch was diluted with 10 kg of acetone/isopropanol mixture (96:4). After 5.5 hours, 150 g of bis(4-tert-butylcyclohexyl) peroxydicarbonate, in solution in 500 g of acetone, were added; after 6 hours 30 minutes, dilution was repeated with 10 kg of acetone/isopropanol mixture (96:4). After 7 hours, a further 150 g of bis(4-tert-butylcyclohexyl) peroxydicarbonate, in solution in 500 g of acetone, were added, and the heating bath was set to a temperature of 60° C.

After a reaction time of 22 hours, the polymerization was discontinued and the batch was cooled to room temperature. The product had a solids content of 50.2% and was dried. The resulting polyacrylate had a K value of 75.2, an average molecular weight of Mw=1 370 000 g/mol, a polydispersity of D (Mw/Mn)=17.13, and a static glass transition temperature of $T_g$=-38.0° C.

This base polymer was melted in a feeder-extruder (single-screw conveying extruder from TROESTER GmbH & Co. Kg, Germany) and in the form of a polymer melt was conveyed with said extruder, via a heatable hose, into a planetary roller extruder from Entex (Bochum). Additionally, the crosslinker Polypox R16 was then added via a metering port. Its concentration in the melt was 0.22 mass percent. All components were mixed to give a homogeneous polymer melt.

Using a melt pump and a heatable hose, the polymer melt was transferred to a twin-screw extruder (from Berstorff). There the accelerator Epikure 925 was added. Its concentration in the melt was 0.14 mass percent. The entire polymer mixture was then freed from all gas inclusions in a vacuum dome under a pressure of 175 mbar. After the vacuum zone, the microballoons were metered in and were incorporated homogeneously into the polymer mixture by means of a mixing element. Their concentration in the melt was 2.0 mass percent. The resulting melt mixture was transferred into a die.

Following exit from the die, in other words after a drop in pressure, the incorporated microballoons underwent expansion, with the drop in pressure producing shear-free cooling of the polymer composition. This gave the foamed polyacrylate PSA 2A, which was subsequently shaped to web form in a thickness of 0.8 mm by means of a roll calender, and was lined with a double-sidedly siliconized release film (50 μm, polyester), while the chemical crosslinking reaction proceeded. The wound film was stored at room temperature for a day before further processing (see below).

An example polyacrylate PSA 2B for producing the two outer layers of the three-layer test adhesive tape 2 was prepared as follows:

A 100 l glass reactor conventional for radical polymerizations was charged with 4.8 kg of acrylic acid, 11.6 kg of butyl acrylate, 23.6 kg of 2-ethylhexyl acrylate, and 26.7 kg of acetone/60/95 special-boiling-point spirit (1:1). After nitrogen gas had been passed through the reactor for 45 minutes, with stirring, the reactor was heated to 58° C. and 30 g of AlBN were added. Thereafter the external heating bath was heated to 75° C. and the reaction was carried out constantly at this external temperature. After a reaction time of 1 hour, a further 30 g of AlBN were added. After 4 hours and again after 8 hours, dilution was carried out with 10.0 kg each time of acetone/60/95 special-boiling-point spirit (1:1) mixture. To reduce the residual initiators, 90 g portions of bis(4-tert-butylcyclohexyl) peroxydicarbonate were added after 8 hours and again after 10 hours. After a reaction time of 24 hours, the reaction was discontinued and the batch was cooled to room temperature. The polyacrylate was subsequently blended with 0.2 mass percent of the crosslinker Uvacure® 1500, then diluted to a solids content of 30% with acetone, and subsequently coated from solution onto a double-sidedly siliconized release film (50 μm, polyester). (Coating speed 2.5 m/min, drying tunnel 15 μm, temperatures zone 1: 40° C., zone 2: 70° C., zone 3: 95° C., zone 4: 105° C.). The thickness was 50 μm. After winding, the film was stored at room temperature for 2 days, before being used further to produce the test adhesive tape 2.

A film of the polyacrylate PSA 2B was laminated onto both sides of the foamed film of polyacrylate PSA 2A. Immediately prior to the laminating of the film of polyacrylate PSA 2B onto the foamed film of polyacrylate PSA 2A, the respective surface of the film of polyacrylate PSA 2A to be laminated was subjected to air corona pretreatment with a corona dose of 35 Wmin/m$^2$. Prior to the second lamination, the double-sidedly siliconized release film of the foamed polyacrylate PSA 2A was lined. After the second lamination, one of the double-sidedly siliconized release films of the two foamed polyacrylate PSAs 2B was lined as well. The 3-layer assembly composed of polyacrylate PSA 2B/polyacrylate PSA 2A/polyacrylate PSA 2B was wound up and stored at room temperature for four weeks before being further used for primer testing. The wound assembly is test adhesive tape 2.

The polyacrylate PSAs of test adhesive tapes 1 and 2, as described by way of example in terms of their composition and production methodology, are described comprehensively in DE 10 2010 062 669. The disclosure content of that specification is incorporated explicitly into the disclosure content of this invention.

Test Adhesive Tape 3 (One-Layer Adhesive Tape Based on an Acrylate/Synthetic Rubber Mixture)

An example polyacrylate PSA 3 for producing the test adhesive tape 3 was prepared as follows:

A reactor conventional for radical polymerizations was charged with 72.0 kg of 2-ethylhexyl acrylate, 20.0 kg of methyl acrylate, 8.0 kg of acrylic acid, and 66.6 kg of acetone/isopropanol (94:6). After nitrogen gas had been passed through the reactor for 45 minutes, with stirring, the reactor was heated to 58° C. and 50 g of AlBN, in solution in 500 g of acetone, were added. Thereafter the external heating bath was heated to 75° C. and the reaction was carried out constantly at this external temperature. After one hour a further 50 g of AlBN, in solution in 500 g of acetone, were added, and after four hours the batch was diluted with 10 kg of acetone/isopropanol mixture (94:6).

After five hours and again after seven hours, initiation was repeated with 150 g each time of bis(4-tert-butylcyclohexyl) peroxydicarbonate, in each case in solution in 500 g of acetone. After a reaction time of 22 hours, the polymerization was discontinued and the batch was cooled to room temperature. The product had a solids content of 55.8% and was freed from the solvent in a concentrating extruder under reduced pressure (residual solvent content≤0.3 mass percent). The resulting polyacrylate had a K value of 58.9, an average molecular weight of Mw=748 000 g/mol, a polydispersity of D (Mw/Mn)=8.9, and a static glass transition temperature of $T_g$=−35.2° C.

The mixture with the synthetic rubber was produced as follows:

In a planetary roller extruder, by means of a solids metering system, the synthetic rubber Kraton D1118 in the form of granules was melted. This was followed by the addition of a microballoon paste (50% Expancel 051DU40 in Ethomeen C25). By means of a side feeder, the polyacrylate base polymer was fed in, having been pre-melted in a single-screw extruder, and a terpene-phenolic resin (Dertophen DT105) was metered in. Added to the mixture were crosslinker solution (Polypox R16 15% in Rheofos RDP) and accelerator solution (15% Epicure 925 in Rheofos RDP). The melt was mixed thoroughly and coated using a two-roll calender between two release films (siliconized PET film). The result was a one-layer adhesive tape having a layer thickness of 1000 μm and a density of 550 kg/m³. This adhesive tape is test adhesive tape 3. The composition was 48% polyacrylate, 25% Kraton D1118, 18% Dertophen DT105, 4% crosslinker/accelerator solution (crosslinker:accelerator=1:1), 5% microballoon paste (figures in wt %).

The copolymer present in the primer in accordance with the invention was produced using the following raw materials:

| Chemical compound | Trade name | Manufacturer | CAS No. |
|---|---|---|---|
| N-Vinylcaprolactam | | Sigma-Aldrich | 2235-00-9 |
| N-Vinyl-2-pyrrolidon | | Sigma-Aldrich | 88-12-0 |
| n-Butyl acrylate | n-Butyl acrylate | Rohm & Haas | 141-32-2 |
| 2-Ethylhexyl acrylate | | Brenntag | 103-11-7 |
| Bis(4-tert-butylcyclohexyl) peroxydicarbonate | Perkadox 16 | Akzo Nobel | 15520-11-3 |
| 2,2'-Azobis(2-methylpropionitrile), AIBN | Vazo 64 | DuPont | 78-67-1 |

In addition, the following solvents were used for production of the copolymer present in the primer in accordance with the invention:

| Designation | CAS No. | Manufacturer |
|---|---|---|
| 60/95 special-boiling-point spirit or naphtha (mineral oil), hydrogen-treated, light | 64742-49-0 | Shell, Exxon |
| Acetone | 67-64-1 | Shell |

The polyacrylate PSAs for use as a constituent in the primer of the invention were prepared as follows:

Primer PSA 1

A 100 l glass reactor conventional for radical polymerizations was charged with 12.0 kg of N-vinylcaprolactam, 28.0 kg of n-butyl acrylate, and 26.7 kg of acetone/60/95 special-boiling-point spirit (1:1). After nitrogen gas had been passed through the reactor for 45 minutes, with stirring, the reactor was heated to 58° C. and 30 g of AIBN were added. Thereafter the external heating bath was heated to 75° C. and the reaction was carried out constantly at this external temperature. After a reaction time of 1 hour, a further 30 g of AIBN were added. After 4 hours and again after 8 hours, dilution took place with 10.0 kg of acetone/60/95 special-boiling-point spirit (1:1) mixture each time. To reduce the residual initiators, 90 g portions of bis(4-tert-butylcyclohexyl) peroxydicarbonate were added after 8 hours and again after 10 hours. After a reaction time of 24 hours, the reaction was discontinued and the batch was cooled to room temperature. The polyacrylate was diluted to a solids content of 40.0 mass percent with acetone. The solution thus obtained is primer PSA 1.

Primer PSA 2

A 100 l glass reactor conventional for radical polymerizations was charged with 8.0 kg of N-vinylcaprolactam, 32.0 kg of 2-ethylhexyl acrylate, and 26.7 kg of acetone/60/95 special-boiling-point spirit (1:1). After nitrogen gas had been passed through the reactor for 45 minutes, with stirring, the reactor was heated to 58° C. and 30 g of AIBN were added. Thereafter the external heating bath was heated to 75° C. and the reaction was carried out constantly at this external temperature. After a reaction time of one hour, a further 30 g of AIBN were added. After 4 hours and again after 8 hours, dilution took place with 10.0 kg of acetone/60/95 special-boiling-point spirit (1:1) mixture each time. To reduce the residual initiators, 90 g portions of bis(4-tert-butylcyclohexyl) peroxydicarbonate were added after 8 hours and again after 10 hours. After a reaction time of 24 hours, the reaction was discontinued and the batch was cooled to room temperature. The polyacrylate was diluted to a solids content of 40.0 mass percent with acetone. The solution thus obtained is primer PSA 2.

Primer PSA 3

A 100 l glass reactor conventional for radical polymerizations was charged with 8.0 kg of N-vinyl-2-pyrrolidone, 32 kg of butyl acrylate, and 26.7 kg of acetone/60/95 special-boiling-point spirit (1:1). After nitrogen gas had been passed through the reactor for 45 minutes, with stirring, the reactor was heated to 58° C. and 30 g of AIBN were added. Thereafter the external heating bath was heated to 75° C. and the reaction was carried out constantly at this external temperature. After a reaction time of one hour, a further 30 g of AIBN were added. After 4 hours and again after 8 hours, dilution took place with 10.0 kg of acetone/60/95 special-boiling-point spirit (1:1) mixture each time. To reduce the residual initiators, 90 g portions of bis(4-tert-butylcyclohexyl) peroxydicarbonate were added after 8 hours and again after 10 hours. After a reaction time of 24 hours, the reaction was discontinued and the batch was cooled to room temperature. The polyacrylate was diluted to a solids content of 40.0 mass percent with acetone. The solution thus obtained is primer PSA 3.

Primer PSA 4 for Comparative Examples

A 100 l glass reactor conventional for radical polymerizations was charged with 15.4 kg of butyl acrylate, 24.4 kg of 2-ethylhexyl acrylate, and 26.7 kg of acetone/60/95 special-boiling-point spirit (1:1). After nitrogen gas had been passed through the reactor for 45 minutes, with stirring, the reactor was heated to 58° C. and 30 g of AIBN were added. Thereafter the external heating bath was heated to 75° C. and the reaction was carried out constantly at this external temperature. After a reaction time of one hour, a further 30 g of AIBN were added. After 4 hours and again after 8 hours, dilution took place with 10.0 kg of acetone/

60/95 special-boiling-point spirit (1:1) mixture each time. To reduce the residual initiators, 90 g portions of bis(4-tert-butylcyclohexyl) peroxydicarbonate were added after 8 hours and again after 10 hours. After a reaction time of 24 hours, the reaction was discontinued and the batch was cooled to room temperature. The polyacrylate was diluted to a solids content of 40.0 mass percent with acetone. The solution thus obtained is primer PSA 4.

Primer PSAs 1 to 4 were briefly characterized by DMA measurements. The G' and G" curves of primer PSAs 1 to 4, within the deformation frequency range from $10^0$ to $10^1$ rad/sec at 23° C., were always situated completely within the range from $10^3$ to $10^7$ Pa. To prepare the primers of the invention, the primer PSAs described above in terms of their preparation and composition, and also the following raw materials, were used:

| Chemical compound/ description (manufacturer data) | Trade name | Manufacturer or supplier | CAS No. |
|---|---|---|---|
| Chlorinated polyolefin, chlorine content: 20%, $M_w$ = 50 000, maleic anhydride-modified, maleic anhydride content: 2.0% | Hardlen F 6P | Toyobo | 560096-07-3 (95%), 3101-60-8 (5%) (manufacturer data) |
| Chlorinated polyolefin, chlorine content: 26%, $M_w$ = 100 000 | Hardlen DX 526 P | Toyobo | 68442-33-1 (94%), 3101-60-8 (5%) 67-66-3 (<1%) (manufacturer data) |
| Hydroxyl-containing polystyrene acrylate, about 65% in butyl acetate/xylene 26:9 | Desmophen A 365 BA/X 65% | Bayer | |
| Epoxy resin based on bisphenol A, mean molecular weight <700 | Epikote 828 | Hexion | 25068-38-6 |
| 3-Glycidoxypropyl-trimethoxysilane | Geniosil® GF 80 | Wacker Chemie | 2530-83-8 |
| Vinyltrimethoxysilane | Geniosil® XL 10 | Wacker Chemie | 2768-02-7 |
| Titanium tetraisopropoxide | Tyzor® TPT | Lehmann & Voss | 546-68-9 |
| Tetra-n-butyl titanate | Tyzor® TnBT | Lehmann &Voss | 5593-70-4 |
| Bis(acetylacetonato) isobutyl isopropyl titanate | Tyzor® AA-95 | Lehmann & Voss | 97281-09-9 |
| Tetra-n-butyl zirconate | Tyzor® NBZ | Lehmann & Voss | 1071-76-7 |
| Acetylacetone | | Sigma-Aldrich | 123-54-6 |

For preparation of further examples, the primers of the invention were modified with the following raw materials:

| Chemical compound/ description (manufacturer data) | Trade name | Manufacturer or supplier |
|---|---|---|
| SBS block copolymer | Kraton® D 1102 E | Kraton Polymers |
| Hydrogenated SEBS block copolymer | Kraton® G 1652 E | Kraton Polymers |

In addition, the following solvents were used for production of the primers of the invention:

| Name | CAS No. | Manufacturer or supplier |
|---|---|---|
| Cyclohexane | 110-82-7 | Brenntag |
| Xylene | 106-42-3 | Biesterfeld |
| Ethylbenzene | 100-41-4 | Alfa Aesar |
| Acetone | 67-64-1 | Shell |
| 60/95 special-boiling-point spirit or naphtha (mineral oil), hydrogen-treated, light | 64742-49-0 | Shell, Exxon |
| Isopropanol | 67-63-0 | Shell |
| Ethyl acetate | 141-78-6 | Brenntag |

In addition, the following fluorescent optical brighteners were also used:

| Chemical compound/ description (manufacturer data) | Trade name | Manufacturer or supplier | CAS No. |
|---|---|---|---|
| 2,5-Thiophenediylbis(5-tert-butyl-1,3-benzoxazole) | Tinopal OB® | BASF | 7128-64-5 |

The raw materials/components specified in the examples were mixed with an IKA® laboratory stirrer system using a propeller stirrer for about two hours. First of all, the respective solvents were mixed, then the chlorinated polyolefin was dissolved therein by stirring for about one hour. The further raw materials were then mixed in individually. In those examples in which acetylacetone was used, the addition and stirring thereof directly followed the dissolution of the chlorinated polyolefin.

Example 1

Composition of the Primer:

| Raw material/component | Weight percent |
|---|---|
| Primer PSA 1 (solids content 40 percent by weight) | 10.40 |
| Hardlen DX 526 P | 1.50 |
| Tyzor TPT | 0.50 |
| Solvents | |
| Cyclohexane | 41.10 |
| Xylene | 19.70 |
| Ethylbenzene | 5.00 |
| Acetone | 7.00 |
| Petroleum | 3.70 |
| Isopropanol | 9.10 |
| Ethyl acetate | 2.00 |
| Total | 100.00 |

| Test adhesive tape | Substrate | Bonding force (300 mm/min) (N/cm) | | Bonding force after conditioned storage (N/cm) | |
|---|---|---|---|---|---|
| | | after 3 min | after 30 min | a) 2 wks. 85° C./ 85% rel. humidity | b) 2 wks. cycle |
| 1 (one-layer AC) | 1 (PP/EPDM smooth) | 60.2 (C) | 64.1 (C) | 62.9 (C) | 60.5 (C) |
| 1 | 2 (PP/EPDM ribbed) | 5.6 (C) | 5.5 (C) | 5.2 (C) | 5.9 (C) |
| 1 | 3 (PP/EPDM ribbed) | 5.6 (C) | 5.4 (C) | 5.9 (C) | 5.8 (C) |
| 1 | 4 (PP/EPDM ribbed) | 6.3 (C) | 6.0 (C) | 6.9 (C) | 6.3 (C) |
| 1 | 5 (PP) | 8.0 (A) | 9.9 (A) | 7.0 (A) | 8.4 (A) |
| 1 | 6 (hot-dip-galvanized steel) | 40.8 (50% C) | 45.3 (60% C) | 36.8 (40% C) | 49.1 (60% C) |
| 1 | 7 (ABS) | 34.5 (30% C) | 45.2 (60% C) | 37.5 (40% C) | 47.8 (60% C) |
| 1 | 8 (PVC) | 35.2 (30% C) | 41.9 (50% C) | 39.2 (40% C) | 44.8 (50% C) |
| 2 (three-layer AC) | 1 (PP/EPDM smooth) | 63.2 (C) | 66.3 (C) | 64.2 (C) | 65.9 (C) |
| 2 | 2 (PP/EPDM ribbed) | 6.6 (C) | 6.9 (C) | 6.9 (C) | 7.0 (C) |
| 2 | 3 (PP/EPDM ribbed) | 6.2 (C) | 6.4 (C) | 6.4 (C) | 6.8 (C) |
| 2 | 4 (PP/EPDM ribbed) | 6.7 (C) | 6.7 (C) | 6.6 (C) | 6.7 (C) |
| 2 | 5 (PP) | 9.1 (A) | 9.7 (A) | 8.1 (A) | 9.9 (A) |
| 2 | 6 (hot-dip-galvanized steel) | 44.1 (50% C) | 45.9 (60% C) | 43.8 (50% C) | 47.9 (60% C) |
| 2 | 7 (ABS) | 44.0 (40% C) | 49.1 (70% C) | 47.2 (50% C) | 48.1 (50% C) |
| 2 | 8 (PVC) | 45.2 (40% C) | 51.9 (50% C) | 43.0 (40% C) | 48.9 (50% C) |
| 3 (one-layer AC/SBS) | 1 (PP/EPDM smooth) | 55.2 (C) | 57.4 (C) | 56.5 (C) | 54.1 (C) |
| 3 | 2 (PP/EPDM ribbed) | 5.2 (C) | 5.6 (C) | 5.6 (C) | 5.5 (C) |
| 3 | 3 (PP/EPDM ribbed) | 5.6 (C) | 5.7 (C) | 5.9 (C) | 5.2 (C) |
| 3 | 4 (PP/EPDM ribbed) | 6.1 (C) | 6.0 (C) | 6.6 (C) | 6.2 (C) |
| 3 | 5 (PP) | 10.0 (A) | 12.9 (A) | 9.3 (A) | 10.9 (A) |
| 3 | 6 (hot-dip-galvanized steel) | 47.4 (50% C) | 55.6 (70% C) | 48.2 (50% C) | 51.3 (60% C) |
| 3 | 7 (ABS) | 39.3 (30% C) | 45.3 (60% C) | 38.9 (30% C) | 44.3 (50% C) |
| 3 | 8 (PVC) | 35.1 (30% C) | 41.2 (50% C) | 36.1 (40% C) | 41.9 (50% C) |

(C) = cohesive split of the adhesive tape (percentage relates to the cohesive proportion; no percentage = 100% C)
(A) = adhesive detachment of the adhesive tape from the primer or of the primer from the substrate Example 2

Composition of the Primer:

| Raw material/component | Weight percent |
|---|---|
| Primer PSA 2 (solids content 40 percent by weight) | 10.40 |
| Hardlen DX 526 P | 1.50 |
| Tyzor TPT | 0.50 |
| Solvents | |
| Cyclohexane | 41.10 |
| Xylene | 19.70 |
| Ethylbenzene | 5.00 |
| Acetone | 7.00 |
| Petroleum | 3.70 |
| Isopropanol | 9.10 |
| Ethyl acetate | 2.00 |
| Total | 100.00 |

The primer was tested in the following combinations, giving the following results:

| Test adhesive tape | Substrate | Bonding force (300 mm/min) (N/cm) | | Bonding force after conditioned storage (N/cm) | |
|---|---|---|---|---|---|
| | | after 3 min | after 30 min | a) 2 wks. 85° C./ 85% rel. humidity | b) 2 wks. cycle |
| 1 (one-layer AC) | 1 (PP/EPDM smooth) | 58.6 (C) | 61.9 (C) | 62.3 (C) | 55.5 (C) |
| 1 | 2 (PP/EPDM ribbed) | 4.7 (C) | 4.6 (C) | 4.2 (C) | 4.4 (C) |
| 1 | 3 (PP/EPDM ribbed) | 4.3 (C) | 4.4 (C) | 4.3 (C) | 4.1 (C) |
| 1 | 4 (PP/EPDM ribbed) | 4.9 (C) | 4.7 (C) | 4.9 (C) | 4.8 (C) |
| 1 | 5 (PP) | 7.5 (A) | 8.1 (A) | 8.0 (A) | 8.2 (A) |
| 1 | 6 (hot-dip-galvanized steel) | 36.7 (40% C) | 35.9 (40% C) | 35.1 (40% C) | 39.9 (50% C) |
| 1 | 7 (ABS) | 36.1 (30% C) | 40.7 (50% C) | 42.5 (40% C) | 46.1 (50% C) |
| 1 | 8 (PVC) | 39.2 (40% C) | 39.9 (50% C) | 43.1 (40% C) | 40.9 (40% C) |
| 2 (three-layer AC) | 1 (PP/EPDM smooth) | 59.9 (C) | 61.4 (C) | 62.1 (C) | 62.8 (C) |
| 2 | 2 (PP/EPDM ribbed) | 5.1 (C) | 5.9 (C) | 5.9 (C) | 5.1 (C) |
| 2 | 3 (PP/EPDM ribbed) | 5.7 (C) | 5.9 (C) | 5.0 (C) | 5.9 (C) |
| 2 | 4 (PP/EPDM ribbed) | 5.0 (C) | 5.6 (C) | 5.2 (C) | 5.9 (C) |
| 2 | 5 (PP) | 5.1 (A) | 6.7 (A) | 7.9 (A) | 6.5 (A) |
| 2 | 6 (hot-dip-galvanized steel) | 42.9 (40% C) | 49.5 (50% C) | 46.3 (50% C) | 45.3 (50% C) |
| 2 | 7 (ABS) | 50.2 (50% C) | 53.4 (70% C) | 49.0 (50% C) | 47.3 (50% C) |
| 2 | 8 (PVC) | 46.2 (40% C) | 48.8 (50% C) | 44.0 (40% C) | 47.3 (50% C) |
| 3 (one-layer AC/SBS) | 1 (PP/EPDM smooth) | 55.2 (C) | 57.4 (C) | 56.5 (C) | 54.1 (C) |
| 3 | 2 (PP/EPDM ribbed) | 5.2 (C) | 5.6 (C) | 5.6 (C) | 5.5 (C) |
| 3 | 3 (PP/EPDM ribbed) | 5.6 (C) | 5.7 (C) | 5.9 (C) | 5.2 (C) |
| 3 | 4 (PP/EPDM ribbed) | 6.1 (C) | 6.0 (C) | 6.6 (C) | 6.2 (C) |
| 3 | 5 (PP) | 9.2 (A) | 10.5 (A) | 9.9 (A) | 11.2 (A) |
| 3 | 6 (hot-dip-galvanized steel) | 37.2 (30% C) | 45.8 (40% C) | 38.9 (30% C) | 40.3 (50% C) |
| 3 | 7 (ABS) | 46.3 (50% C) | 49.3 (60% C) | 48.3 (40% C) | 49.1 (50% C) |
| 3 | 8 (PVC) | 35.7 (30% C) | 39.2 (50% C) | 39.1 (40% C) | 40.6 (50% C) |

(C) = cohesive split of the adhesive tape (percentage relates to the cohesive proportion; no percentage = 100% C)

(A) = adhesive detachment of the adhesive tape from the primer or of the primer from the substrate

Example 3

Composition of the Primer:

| Raw material/component | Weight percent |
|---|---|
| Primer PSA 1 (solids content 40 percent by weight) | 10.40 |
| Hardlen DX 526 P | 1.50 |
| Tyzor TnBT | 0.50 |
| Solvents | |
| Cyclohexane | 41.10 |
| Xylene | 19.70 |
| Ethylbenzene | 5.00 |
| Acetone | 7.00 |
| Petroleum | 3.70 |
| Isopropanol | 9.10 |
| Ethyl acetate | 2.00 |
| Total | 100.00 |

The primer was tested in the following combinations, giving the following results:

| Test adhesive tape | Substrate | Bonding force (300 mm/min) (N/cm) | | Bonding force after conditioned storage (N/cm) | |
|---|---|---|---|---|---|
| | | after 3 min | after 30 min | a) 2 wks. 85° C./ 85% rel. humidity | b) 2 wks. cycle |
| 1 (one-layer AC) | 1 (PP/EPDM smooth) | 59.4 (C) | 63.8 (C) | 58.9 (C) | 63.3 (C) |
| 1 | 2 (PP/EPDM ribbed) | 5.9 (C) | 6.2 (C) | 5.4 (C) | 5.5 (C) |
| 1 | 3 (PP/EPDM ribbed) | 5.6 (C) | 6.0 (C) | 5.0 (C) | 5.3 (C) |
| 1 | 4 (PP/EPDM ribbed) | 6.8 (C) | 7.2 (C) | 6.9 (C) | 6.6 (C) |
| 1 | 5 (PP) | 10.8 (A) | 11.5 (A) | nd | nd |
| 1 | 6 (hot-dip-galvanized steel) | 42.1 (50% C) | 45.9 (50% C) | nd | nd |
| 1 | 7 (ABS) | 41.5 (50% C) | 49.2 (60% C) | nd | nd |
| 1 | 8 (PVC) | 40.7 (50% C) | 51.9 (60% C) | nd | nd |
| 3 (one-layer AC/SBS) | 1 (PP/EPDM smooth) | 52.1 (C) | 55.1 (C) | 54.1 (C) | 52.6 (C) |
| 3 | 2 (PP/EPDM ribbed) | 4.8 (C) | 4.8 (C) | 5.2 (C) | 5.1 (C) |
| 3 | 3 (PP/EPDM ribbed) | 4.7 (C) | 4.9 (C) | 4.9 (C) | 5.2 (C) |
| 3 | 4 (PP/EPDM ribbed) | 4.3 (C) | 4.9 (C) | 5.9 (C) | 4.8 (C) |
| 3 | 5 (PP) | 12.5 (A) | 13.6 (A) | nd | nd |
| 3 | 6 (hot-dip-galvanized steel) | 37.2 (40% C) | 45.0 (50% C) | nd | nd |
| 3 | 7 (ABS) | 42.3 (50% C) | 48.0 (50% C) | nd | nd |
| 3 | 8 (PVC) | 45.5 (50% C) | 47.1 (50% C) | nd | nd |

(C) = cohesive split of the adhesive tape (percentage relates to the cohesive proportion; no percentage = 100% C)
(A) = adhesive detachment of the adhesive tape from the primer or of the primer from the substrate
nd = not determined Example 4

Composition of the Primer:

| Raw material/component | Weight percent |
|---|---|
| Primer PSA 1 (solids content 40 percent by weight) | 10.40 |
| Hardlen DX 526 P | 1.50 |
| Tyzor TPT | 1.00 |
| Geniosil GF 80 | 0.50 |

| Solvents | Weight percent |
|---|---|
| Cyclohexane | 40.10 |
| Xylene | 19.70 |
| Ethylbenzene | 5.00 |
| Acetone | 7.00 |
| Petroleum | 3.70 |
| Isopropanol | 9.10 |
| Ethyl acetate | 2.00 |
| Total | 100.00 |

The primer was tested in the following combinations, giving the following results:

| Test adhesive tape | Substrate | Bonding force (300 mm/min) (N/cm) | | Bonding force after conditioned storage (N/cm) | |
|---|---|---|---|---|---|
| | | after 3 min | after 30 min | a) 2 wks. 85° C./ 85% rel. humidity | b) 2 wks. cycle |
| 1 (one-layer AC) | 1 (PP/EPDM smooth) | 58.2 (C) | 59.8 (C) | 59.9 (C) | 65.1 (C) |
| 1 | 2 (PP/EPDM ribbed) | 5.5 (C) | 6.9 (C) | 5.4 (C) | 5.5 (C) |
| 1 | 3 (PP/EPDM ribbed) | 5.3 (C) | 6.8 (C) | 5.0 (C) | 5.3 (C) |
| 1 | 4 (PP/EPDM ribbed) | 6.5 (C) | 6.1 (C) | 6.0 (C) | 7.4 (C) |
| 1 | 5 (PP) | 30.9 (50% C) | 42.5 (50% C) | nd | nd |
| 1 | 6 (hot-dip-galvanized steel) | 62.1 (C) | 65.0 (C) | nd | nd |
| 1 | 7 (ABS) | 49.2 (60% C) | 49.9 (60% C) | nd | nd |

-continued

| Test adhesive tape | Substrate | Bonding force (300 mm/min) (N/cm) | | Bonding force after conditioned storage (N/cm) | |
|---|---|---|---|---|---|
| | | after 3 min | after 30 min | a) 2 wks. 85° C./ 85% rel. humidity | b) 2 wks. cycle |
| 1 | 8 (PVC) | 44.7 (50% C) | 51.1 (60% C) | nd | nd |
| 3 | 1 (PP/EPDM one-layer smooth) AC/SBS | 49.1 (C) | 51.4 (C) | 54.9 (C) | 54.3 (C) |
| 3 | 2 (PP/EPDM ribbed) | 4.1 (C) | 5.0 (C) | 5.1 (C) | 4.5 (C) |
| 3 | 3 (PP/EPDM ribbed) | 4.8 (C) | 5.7 (C) | 4.4 (C) | 4.9 (C) |
| 3 | 4 (PP/EPDM ribbed) | 4.4 (C) | 4.9 (C) | 5.0 (C) | 4.7 (C) |
| 3 | 5 (PP) | 25.9 (30% C) | 33.1 (40% C) | nd | nd |
| 3 | 6 (hot-dip-galvanized steel) | 47.9 (50% C) | 47.0 (50% C) | nd | nd |
| 3 | 7 (ABS) | 44.1 (50% C) | 46.0 (50% C) | nd | nd |
| 3 | 8 (PVC) | 44.5 (50% C) | 45.1 (50% C) | nd | nd |

(C) = cohesive split of the adhesive tape (percentage relates to the cohesive proportion; no percentage = 100% C)
A = adhesive detachment of the adhesive tape from the primer or of the primer from the substrate
nd = not determined Example 5

Composition of the Primer:

| Raw material/component | Weight percent |
|---|---|
| Primer PSA 1 (solids content 40 percent by weight) | 10.40 |
| Hardlen DX 526 P | 1.50 |
| Tyzor TnBT | 1.00 |
| Geniosil GF 80 | 0.50 |

| Solvents | Weight percent |
|---|---|
| Cyclohexane | 40.10 |
| Xylene | 19.70 |
| Ethylbenzene | 5.00 |
| Acetone | 7.00 |
| Petroleum | 3.70 |
| Isopropanol | 9.10 |
| Ethyl acetate | 2.00 |
| Total | 100.00 |

The primer was tested in the following combinations, giving the following results:

| Test adhesive tape | Substrate | Bonding force (300 mm/min) (N/cm) | | Bonding force after conditioned storage (N/cm) | |
|---|---|---|---|---|---|
| | | after 3 min | after 30 min | a) 2 wks. 85° C./ 85% rel. humidity | b) 2 wks. cycle |
| 1 | 1 (PP/EPDM one-layer smooth AC) | 59.7 (C) | 62.1 (C) | 60.3 (C) | 60.9 (C) |
| 1 | 2 (PP/EPDM ribbed) | 5.7 (C) | 5.9 (C) | 5.9 (C) | 5.6 (C) |
| 1 | 3 (PP/EPDM ribbed) | 5.8 (C) | 5.9 (C) | 5.2 (C) | 5.5 (C) |
| 1 | 4 (PP/EPDM ribbed) | 6.0 (C) | 6.9 (C) | 6.6 (C) | 6.1 (C) |
| 1 | 5 (PP) | 35.2 (50% C) | 39.2 (50% C) | nd | nd |
| 1 | 6 (hot-dip-galvanized steel) | 65.1 (C) | 67.9 (C) | nd | nd |
| 1 | 7 (ABS) | 50.2 (60% C) | 52.5 (60% C) | nd | nd |
| 1 | 8 (PVC) | 48.6 (50% C) | 47.1 (50% C) | nd | nd |
| 3 | 1 (PP/EPDM one-layer smooth) AC/SBS | 55.3 (C) | 53.4 (C) | 56.7 (C) | 55.1 (C) |
| 3 | 2 (PP/EPDM ribbed) | 5.1 (C) | 5.8 (C) | 5.8 (C) | 5.2 (C) |
| 3 | 3 (PP/EPDM ribbed) | 5.2 (C) | 5.4 (C) | 5.9 (C) | 6.5 (C) |
| 3 | 4 (PP/EPDM ribbed) | 5.4 (C) | 5.9 (C) | 6.3 (C) | 6.2 (C) |
| 3 | 5 (PP) | 35.2 (50% C) | 43.1 (50% C) | nd | nd |

| Test adhesive tape | Substrate | Bonding force (300 mm/min) (N/cm) after 3 min | Bonding force (300 mm/min) (N/cm) after 30 min | Bonding force after conditioned storage (N/cm) a) 2 wks. 85° C./ 85% rel. humidity | Bonding force after conditioned storage (N/cm) b) 2 wks. cycle |
|---|---|---|---|---|---|
| 3 | 6 (hot-dip-galvanized steel) | 43.3 (50% C) | 47.6 (50% C) | nd | nd |
| 3 | 7 (ABS) | 41.8 (50% C) | 47.2 (50% C) | nd | nd |
| 3 | 8 (PVC) | 54.2 (50% C) | 55.6 (50% C) | nd | nd |

(C) = cohesive split of the adhesive tape (percentage relates to the cohesive proportion; no percentage = 100% C)
A = adhesive detachment of the adhesive tape from the primer or of the primer from the substrate
nd = not determined

Example 6

Composition of the Primer:

| Raw material/component | Weight percent |
|---|---|
| Primer PSA 1 (solids content 40 percent by weight) | 10.40 |
| Hardlen F6 P | 1.50 |
| Tyzor TPT | 0.50 |
| Acetylacetone | 0.50 |
| Solvents | |
| Cyclohexane | 40.60 |
| Xylene | 19.70 |
| Ethylbenzene | 5.00 |
| Acetone | 7.00 |
| Petroleum | 3.70 |
| Isopropanol | 9.10 |
| Ethyl acetate | 2.00 |
| Total | 100.00 |

The primer was tested in the following combinations, giving the following results:

| Test adhesive tape | Substrate | Bonding force (300 mm/min) (N/cm) after 3 min | Bonding force (300 mm/min) (N/cm) after 30 min | Bonding force after conditioned storage (N/cm) a) 2 wks. 85° C./ 85% rel. humidity | Bonding force after conditioned storage (N/cm) b) 2 wks. cycle |
|---|---|---|---|---|---|
| 1 (one-layer smooth) AC) | 1 (PP/EPDM | 61.6 (C) | 63.5 (C) | 60.8 (C) | 61.3 (C) |
| 1 | 2 (PP/EPDM ribbed) | 6.1 (C) | 6.6 (C) | 6.2 (C) | 6.0 (C) |
| 1 | 3 (PP/EPDM ribbed) | 5.9 (C) | 6.3 (C) | 6.4 (C) | 6.2 (C) |
| 1 | 4 (PP/EPDM ribbed) | 6.3 (C) | 6.9 (C) | 6.7 (C) | 5.1 (C) |
| 1 | 5 (PP) | 25.5 (30% C) | 29.1 (30% C) | nd | nd |
| 1 | 6 (hot-dip-galvanized steel) | 64.1 (C) | 65.6 (C) | nd | nd |
| 1 | 7 (ABS) | 56.3 (90% C) | 59.5 (90% C) | nd | nd |
| 1 | 8 (PVC) | 58.2 (90% C) | 56.9 (90% C) | nd | nd |
| 3 (one-layer smooth) AC/SBS) | 1 (PP/EPDM | 57.1 (C) | 54.3 (C) | 54.1 (C) | 53.5 (C) |
| 3 | 2 (PP/EPDM ribbed) | 5.5 (C) | 5.7 (C) | 4.2 (C) | 4.6 (C) |
| 3 | 3 (PP/EPDM ribbed) | 5.5 (C) | 5.1 (C) | 5.2 (C) | 6.7 (C) |
| 3 | 4 (PP/EPDM ribbed) | 5.0 (C) | 6.9 (C) | 6.0 (C) | 4.2 (C) |
| 3 | 5 (PP) | 55.8 (90% C) | 59.2 (90% C) | nd | nd |
| 3 | 6 (hot-dip-galvanized steel) | 42.5 (50% C) | 46.2 (50% C) | nd | nd |
| 3 | 7 (ABS) | 51.3 (70% C) | 58.9 (90% C) | nd | nd |
| 3 | 8 (PVC) | 55.2 (80% C) | 59.1 (90% C) | nd | nd |

(C) = cohesive split of the adhesive tape (percentage relates to the cohesive proportion; no percentage = 100% C)
A = adhesive detachment of the adhesive tape from the primer or of the primer from the substrate
nd = not determined

Example 7

Composition of the Primer:

| Raw material/component | Weight percent |
|---|---|
| Primer PSA 1 (solids content 40 percent by weight) | 10.40 |
| Hardlen F6 P | 1.50 |
| Tyzor TPT | 0.50 |
| Geniosil GF 80 | 0.50 |
| Acetylacetone | 0.50 |
| Solvents | |
| Cyclohexane | 40.10 |
| Xylene | 19.70 |
| Ethylbenzene | 5.00 |
| Acetone | 7.00 |
| Petroleum | 3.70 |
| Isopropanol | 9.10 |
| Ethyl acetate | 2.00 |
| Total | 100.00 |

The primer was tested in the following combinations, giving the following results:

Example 8

Composition of the Primer:

| Raw material/component | Weight percent |
|---|---|
| Primer PSA 1 (solids content 40 percent by weight) | 10.40 |
| Hardlen F6 P | 1.50 |
| Tyzor TPT | 0.50 |
| Geniosil GF 80 | 0.50 |
| Desmophen A 365 | 2.60 |
| Acetylacetone | 0.50 |
| Solvents | |
| Cyclohexane | 37.50 |
| Xylene | 19.70 |
| Ethylbenzene | 5.00 |
| Acetone | 7.00 |
| Petroleum | 3.70 |
| Isopropanol | 9.10 |
| Ethyl acetate | 2.00 |
| Total | 100.00 |

| Test adhesive tape | Substrate | Bonding force (300 mm/min) (N/cm) after 3 min | Bonding force (300 mm/min) (N/cm) after 30 min | Bonding force after conditioned storage (N/cm) a) 2 wks. 85° C./ 85% rel. humidity | Bonding force after conditioned storage (N/cm) b) 2 wks. cycle |
|---|---|---|---|---|---|
| 1 (one-layer AC) | 1 (PP/EPDM smooth) | 60.4 (C) | 64.1 (C) | 62.3 (C) | 65.1 (C) |
| 1 | 2 (PP/EPDM ribbed) | 5.3 (C) | 5.6 (C) | 5.1 (C) | 5.9 (C) |
| 1 | 3 (PP/EPDM ribbed) | 5.1 (C) | 6.2 (C) | 5.3 (C) | 5.4 (C) |
| 1 | 4 (PP/EPDM ribbed) | 5.6 (C) | 5.2 (C) | 5.9 (C) | 5.0 (C) |
| 1 | 5 (PP) | 57.9 (90% C) | 59.2 (90% C) | nd | nd |
| 1 | 6 (hot-dip-galvanized steel) | 62.5 (C) | 66.1 (C) | nd | nd |
| 1 | 7 (ABS) | 59.1 (90% C) | 60.3 (C) | nd | nd |
| 1 | 8 (PVC) | 60.3 (C) | 63.2 (C) | nd | nd |
| 3 (one-layer AC/SBS) | 1 (PP/EPDM smooth) | 59.3 (C) | 62.3 (C) | 55.7 (C) | 57.2 (C) |
| 3 | 2 (PP/EPDM ribbed) | 5.1 (C) | 5.9 (C) | 5.3 (C) | 5.2 (C) |
| 3 | 3 (PP/EPDM ribbed) | 5.1 (C) | 5.9 (C) | 5.3 (C) | 5.6 (C) |
| 3 | 4 (PP/EPDM ribbed) | 5.3 (C) | 5.4 (C) | 5.1 (C) | 5.2 (C) |
| 3 | 5 (PP) | 59.1 (90% C) | 62.6 (C) | nd | nd |
| 3 | 6 (hot-dip-galvanized steel) | 60.4 (C) | 61.0 (C) | nd | nd |
| 3 | 7 (ABS) | 61.4 (C) | 59.2 (C) | nd | nd |
| 3 | 8 (PVC) | 59.3 (90% C) | 60.4 (C) | nd | nd |

(C) = cohesive split of the adhesive tape (percentage relates to the cohesive proportion; no percentage = 100% C)

A = adhesive detachment of the adhesive tape from the primer or of the primer from the substrate nd = not determined The primer was tested in the following combinations, giving the following results:

| Test adhesive tape | Substrate | Bonding force (300 mm/min) (N/cm) after 3 min | Bonding force (300 mm/min) (N/cm) after 30 min | Bonding force after conditioned storage (N/cm) a) 2 wks. 85° C./ 85% rel. humidity | Bonding force after conditioned storage (N/cm) b) 2 wks. cycle |
|---|---|---|---|---|---|
| 1 (one-layer AC) | 1 (PP/EPDM smooth) | 62.3 (C) | 64.9 (C) | 63.1 (C) | 59.4 (C) |
| 1 | 2 (PP/EPDM ribbed) | 5.6 (C) | 5.9 (C) | 5.2 (C) | 5.2 (C) |
| 1 | 3 (PP/EPDM ribbed) | 5.4 (C) | 5.2 (C) | 5.3 (C) | 5.7 (C) |
| 1 | 4 (PP/EPDM ribbed) | 4.8 (C) | 4.9 (C) | 5.2 (C) | 5.3 (C) |
| 1 | 5 (PP) | 57.2 (90% C) | 60.9 (C) | nd | nd |
| 1 | 6 (hot-dip-galvanized steel) | 59.3 (90% C) | 62.1 (C) | nd | nd |
| 1 | 7 (ABS) | 56.3 (90% C) | 62.3 (C) | nd | nd |
| 1 | 8 (PVC) | 62.4 (C) | 65.1 (C) | nd | nd |
| 3 (one-layer AC/SBS) | 1 (PP/EPDM smooth) | 59.3 (C) | 62.3 (C) | 56.7 (C) | 52.3 (C) |
| 3 | 2 (PP/EPDM ribbed) | 5.4 (C) | 6.3 (C) | 6.1 (C) | 6.9 (C) |
| 3 | 3 (PP/EPDM ribbed) | 5.9 (C) | 5.9 (C) | 5.4 (C) | 5.7 (C) |
| 3 | 4 (PP/EPDM ribbed) | 5.8 (C) | 5.5 (C) | 5.6 (C) | 6.0 (C) |
| 3 | 5 (PP) | 59.6 (C) | 61.3 (C) | nd | nd |
| 3 | 6 (hot-dip-galvanized steel) | 62.4 (C) | 66.2 (C) | nd | nd |
| 3 | 7 (ABS) | 64.1 (C) | 60.3 (C) | nd | nd |
| 3 | 8 (PVC) | 62.7 (C) | 63.0 (C) | nd | nd |

(C) = cohesive split of the adhesive tape (percentage relates to the cohesive proportion; no percentage = 100% C)
A = adhesive detachment of the adhesive tape from the primer or of the primer from the substrate
nd = not determined

Example 9

Composition of the Primer:

| Raw material/component | Weight percent |
|---|---|
| Primer PSA 1 (solids content 40 percent by weight) | 10.40 |
| Hardlen F6 P | 1.50 |
| Tyzor TPT | 0.50 |
| Geniosil GF 80 | 0.50 |
| Desmophen A 365 | 2.60 |
| Epikote 828 | 0.20 |
| Acetylacetone | 0.50 |
| Tinopal OB | 0.15 |

| Solvents | Weight percent |
|---|---|
| Cyclohexane | 37.15 |
| Xylene | 19.70 |
| Ethylbenzene | 5.00 |
| Acetone | 7.00 |
| Petroleum | 3.70 |
| Isopropanol | 9.10 |
| Ethyl acetate | 2.00 |
| Total | 100.00 |

The primer was tested in the following combinations, giving the following results:

| Test adhesive tape | Substrate | Bonding force (300 mm/min) (N/cm) after 3 min | Bonding force (300 mm/min) (N/cm) after 30 min | Bonding force after conditioned storage (N/cm) a) 2 wks. 85° C./ 85% rel. humidity | Bonding force after conditioned storage (N/cm) b) 2 wks. cycle |
|---|---|---|---|---|---|
| 1 (one-layer AC) | 1 (PP/EPDM smooth) | 63.6 (C) | 64.3 (C) | 63.7 (C) | 60.9 (C) |
| 1 | 2 (PP/EPDM ribbed) | 5.8 (C) | 6.8 (C) | 6.4 (C) | 6.1 (C) |
| 1 | 3 (PP/EPDM ribbed) | 5.3 (C) | 5.9 (C) | 5.9 (C) | 6.7 (C) |
| 1 | 4 (PP/EPDM ribbed) | 5.4 (C) | 5.6 (C) | 5.4 (C) | 5.8 (C) |
| 1 | 5 (PP) | 60.5 (C) | 63.8 (C) | 62.7 (C) | 63.1 (C) |

-continued

| Test adhesive tape | Substrate | Bonding force (300 mm/min) (N/cm) after 3 min | Bonding force (300 mm/min) (N/cm) after 30 min | Bonding force after conditioned storage (N/cm) a) 2 wks. 85° C./85% rel. humidity | Bonding force after conditioned storage (N/cm) b) 2 wks. cycle |
|---|---|---|---|---|---|
| 1 | 6 (hot-dip-galvanized steel) | 59.9 (C) | 65.2 (C) | 64.6 (C) | 63.3 (C) |
| 1 | 7 (ABS) | 62.3 (C) | 66.1 (C) | 64.1 (C) | 63.1 (C) |
| 1 | 8 (PVC) | 62.6 (C) | 62.8 (C) | 64.7 (C) | 63.3 (C) |
| 3 (one-layer AC/SBS) | 1 (PP/EPDM smooth) | 59.9 (C) | 61.7 (C) | 59.6 (C) | 62.4 (C) |
| 3 | 2 (PP/EPDM ribbed) | 5.6 (C) | 6.5 (C) | 6.5 (C) | 7.3 (C) |
| 3 | 3 (PP/EPDM ribbed) | 6.2 (C) | 6.9 (C) | 6.8 (C) | 6.7 (C) |
| 3 | 4 (PP/EPDM ribbed) | 6.2 (C) | 6.5 (C) | 6.9 (C) | 6.4 (C) |
| 3 | 5 (PP) | 62.2 (C) | 64.0 (C) | 62.1 (C) | 64.6 (C) |
| 3 | 6 (hot-dip-galvanized steel) | 63.0 (C) | 66.9 (C) | 64.3 (C) | 65.1 (C) |
| 3 | 7 (ABS) | 65.3 (C) | 62.1 (C) | 66.1 (C) | 62.4 (C) |
| 3 | 8 (PVC) | 62.9 (C) | 65.4 (C) | 64.1 (C) | 65.0 (C) |

(C) = cohesive split of the adhesive tape (percentage relates to the cohesive proportion; no percentage = 100% C)
A = adhesive detachment of the adhesive tape from the primer or of the primer from the substrate
nd = not determined

Example 10

Composition of the Primer:

| Raw material/component | Weight percent |
|---|---|
| Primer PSA 1 (solids content 40 percent by weight) | 10.40 |
| Hardlen F6 P | 1.50 |
| Tyzor TPT | 2.00 |
| Geniosil GF 80 | 1.00 |
| Desmophen A 365 | 2.60 |
| Epikote 828 | 0.20 |
| Acetylacetone | 1.00 |
| Tinopal OB | 0.15 |

-continued

| | Weight percent |
|---|---|
| Solvents | |
| Cyclohexane | 35.00 |
| Xylene | 19.70 |
| Ethylbenzene | 5.00 |
| Acetone | 6.65 |
| Petroleum | 3.70 |
| Isopropanol | 9.10 |
| Ethyl acetate | 2.00 |
| Total | 100.00 |

The primer was tested in the following combinations, giving the following results:

| Test adhesive tape | Substrate | Bonding force (300 mm/min) (N/cm) after 3 min | Bonding force (300 mm/min) (N/cm) after 30 min | Bonding force after conditioned storage (N/cm) a) 2 wks. 85° C./85% rel. humidity | Bonding force after conditioned storage (N/cm) b) 2 wks. cycle |
|---|---|---|---|---|---|
| 1 (one-layer AC) | 1 (PP/EPDM smooth) | 64.1 (C) | 65.1 (C) | 60.3 (C) | 62.8 (C) |
| 1 | 2 (PP/EPDM ribbed) | 5.3 (C) | 5.3 (C) | 5.7 (C) | 5.1 (C) |
| 1 | 3 (PP/EPDM ribbed) | 5.0 (C) | 5.3 (C) | 4.6 (C) | 4.9 (C) |
| 1 | 4 (PP/EPDM ribbed) | 5.1 (C) | 5.7 (C) | 5.3 (C) | 5.9 (C) |
| 1 | 5 (PP) | 59.2 (C) | 60.1 (C) | 60.8 (C) | 64.3 (C) |
| 1 | 6 (hot-dip-galvanized steel) | 62.3 (C) | 66.0 (C) | 62.7 (C) | 65.1 (C) |
| 1 | 7 (ABS) | 61.6 (C) | 64.3 (C) | 63.2 (C) | 60.6 (C) |
| 1 | 8 (PVC) | 60.7 (C) | 61.9 (C) | 63.6 (C) | 61.4 (C) |
| 3 (one-layer AC/SBS) | 1 (PP/EPDM smooth) | 62.3 (C) | 64.8 (C) | 62.0 (C) | 62.5 (C) |
| 3 | 2 (PP/EPDM ribbed) | 5.7 (C) | 5.9 (C) | 5.5 (C) | 5.0 (C) |
| 3 | 3 (PP/EPDM ribbed) | 5.3 (C) | 5.2 (C) | 5.3 (C) | 5.6 (C) |

-continued

| Test adhesive tape | Substrate | Bonding force (300 mm/min) (N/cm) | | Bonding force after conditioned storage (N/cm) | |
|---|---|---|---|---|---|
| | | after 3 min | after 30 min | a) 2 wks. 85° C./ 85% rel. humidity | b) 2 wks. cycle |
| 3 | 4 (PP/EPDM ribbed) | 5.7 (C) | 5.9 (C) | 5.8 (C) | 5.4 (C) |
| 3 | 5 (PP) | 61.4 (C) | 63.2 (C) | 61.9 (C) | 63.7 (C) |
| 3 | 6 (hot-dip-galvanized steel) | 60.0 (C) | 64.3 (C) | 64.3 (C) | 63.2 (C) |
| 3 | 7 (ABS) | 62.1 (C) | 64.7 (C) | 65.2 (C) | 61.6 (C) |
| 3 | 8 (PVC) | 61.2 (C) | 63.6 (C) | 66.6 (C) | 64.2 (C) |

(C) = cohesive split of the adhesive tape (percentage relates to the cohesive proportion; no percentage = 100% C)
A = adhesive detachment of the adhesive tape from the primer or of the primer from the substrate
nd = not determined

Example 11

Composition of the Primer:

| Raw material/component | Weight percent |
|---|---|
| Primer PSA 2 (solids content 40 percent by weight) | 10.40 |
| Hardlen F6 P | 1.50 |
| Tyzor TPT | 0.50 |
| Geniosil GF 80 | 0.50 |
| Desmophen A 365 | 2.60 |
| Epikote 828 | 0.20 |
| Acetylacetone | 0.50 |
| Tinopal OB | 0.15 |

| Solvents | Weight percent |
|---|---|
| Cyclohexane | 37.15 |
| Xylene | 19.70 |
| Ethylbenzene | 5.00 |
| Acetone | 7.00 |
| Petroleum | 3.70 |
| Isopropanol | 9.10 |
| Ethyl acetate | 2.00 |
| Total | 100.00 |

The primer was tested in the following combinations, giving the following results:

| Test adhesive tape | Substrate | Bonding force (300 mm/min) (N/cm) | | Bonding force after conditioned storage (N/cm) | |
|---|---|---|---|---|---|
| | | after 3 min | after 30 min | a) 2 wks. 85° C./ 85% rel. humidity | b) 2 wks. cycle |
| 1 (one-layer AC) | 1 (PP/EPDM smooth) | 59.8 (C) | 63.1 (C) | nd | nd |
| 1 | 2 (PP/EPDM ribbed) | 6.2 (C) | 6.4 (C) | nd | nd |
| 1 | 3 (PP/EPDM ribbed) | 6.1 (C) | 6.8 (C) | nd | nd |
| 1 | 4 (PP/EPDM ribbed) | 6.2 (C) | 6.7 (C) | nd | nd |
| 1 | 5 (PP) | nd | nd | nd | nd |
| 1 | 6 (hot-dip-galvanized steel) | nd | nd | nd | nd |
| 1 | 7 (ABS) | nd | nd | nd | nd |
| 1 | 8 (PVC) | nd | nd | nd | nd |
| 3 (one-layer AC/SBS) | 1 (PP/EPDM smooth) | 62.1 (C) | 65.6 (C) | nd | nd |
| 3 | 2 (PP/EPDM ribbed) | 5.3 (C) | 5.9 (C) | 5.1 (C) | 5.6 (C) |
| 3 | 3 (PP/EPDM ribbed) | 5.9 (C) | 6.0 (C) | nd | nd |
| 3 | 4 (PP/EPDM ribbed) | 5.5 (C) | 6.0 (C) | nd | nd |
| 3 | 5 (PP) | 59.2 (90% C) | 59.9 (90% C) | 58.2 (90% C) | 60.6 (90% C) |
| 3 | 6 (hot-dip-galvanized steel) | 61.2 (C) | 64.6 (C) | 64.0 (C) | 65.3 (C) |
| 3 | 7 (ABS) | 61.4 (C) | 64.6 (C) | nd | nd |
| 3 | 8 (PVC) | 60.8 (C) | 62.6 (C) | nd | nd |

(C) = cohesive split of the adhesive tape (percentage relates to the cohesive proportion; no percentage = 100% C)
A = adhesive detachment of the adhesive tape from the primer or of the primer from the substrate
nd = not determined

Example 12

Composition of the Primer:

| Raw material/component | Weight percent |
|---|---|
| Primer PSA 3 (solids content 40 percent by weight) | 10.40 |
| Hardlen F6 P | 1.50 |
| Tyzor TPT | 0.50 |
| Geniosil GF 80 | 0.50 |
| Desmophen A 365 | 2.60 |
| Epikote 828 | 0.20 |
| Acetylacetone | 0.50 |
| Tinopal OB | 0.15 |

| | Weight percent |
|---|---|
| Solvents | |
| Cyclohexane | 37.15 |
| Xylene | 19.70 |
| Ethylbenzene | 5.00 |
| Acetone | 7.00 |
| Petroleum | 3.70 |
| Isopropanol | 9.10 |
| Ethyl acetate | 2.00 |
| Total | 100.00 |

The primer was tested in the following combinations, giving the following results:

| Test adhesive tape | Substrate | Bonding force (300 mm/min) (N/cm) after 3 min | Bonding force (300 mm/min) (N/cm) after 30 min | Bonding force after conditioned storage (N/cm) a) 2 wks. 85° C./ 85% rel. humidity | Bonding force after conditioned storage (N/cm) b) 2 wks. cycle |
|---|---|---|---|---|---|
| 3 (one-layer AC/SBS) | 1 (PP/EPDM smooth) | 60.7 (C) | 63.2 (C) | nd | nd |
| 3 | 2 (PP/EPDM ribbed) | 5.9 (C) | 6.1 (C) | 6.0 (C) | 6.3 (C) |
| 3 | 5 (PP) | 57.4 (90% C) | 59.3 (90% C) | 54.1 (80% C) | 55.6 (80% C) |
| 3 | 6 (hot-dip-galvanized steel) | 63.6 (C) | 61.7 (C) | 63.2 (C) | 60.6 (C) |
| 3 | 8 (PVC) | 61.7 (C) | 62.9 (C) | nd | nd |

(C) = cohesive split of the adhesive tape (percentage relates to the cohesive proportion; no percentage = 100% C)
A = adhesive detachment of the adhesive tape from the primer or of the primer from the substrate
nd = not determined

Example 13

Composition of the Primer:

| Raw material/component | Weight percent |
|---|---|
| Primer PSA 1 (solids content 40 percent by weight) | 10.40 |
| Hardlen F6 P | 1.50 |
| Tyzor TnBT | 0.50 |
| Geniosil GF 80 | 0.50 |
| Desmophen A 365 | 2.60 |
| Epikote 828 | 0.20 |
| Acetylacetone | 0.50 |
| Solvents | |
| Cyclohexane | 37.30 |
| Xylene | 19.70 |
| Ethylbenzene | 5.00 |
| Acetone | 7.00 |
| Petroleum | 3.70 |
| Isopropanol | 9.10 |
| Ethyl acetate | 2.00 |
| Total | 100.00 |

The primer was tested in the following combinations, giving the following results:

| Test adhesive tape | Substrate | Bonding force (300 mm/min) (N/cm) | | Bonding force after conditioned storage (N/cm) | |
|---|---|---|---|---|---|
| | | after 3 min | after 30 min | a) 2 wks. 85° C./ 85% rel. humidity | b) 2 wks. cycle |
| 3 (one-layer AC/SBS) | 1 (PP/EPDM smooth) | 62.6 (C) | 65.1 (C) | nd | nd |
| 3 | 2 (PP/EPDM ribbed) | 5.6 (C) | 5.9 (C) | 5.2 (C) | 5.6 (C) |
| 3 | 5 (PP) | 56.6 (80% C) | 60.1 (90% C) | 55.9 (80% C) | 50.3 (80% C) |
| 3 | 6 (hot-dip-galvanized steel) | 61.9 (C) | 65.6 (C) | 61.7 (C) | 62.3 (C) |
| 3 | 8 (PVC) | 64.7 (C) | 65.6 (C) | nd | nd |

(C) = cohesive split of the adhesive tape (percentage relates to the cohesive proportion; no percentage = 100% C)
A = adhesive detachment of the adhesive tape from the primer or of the primer from the substrate
nd = not determined

Example 14

Composition of the Primer:

| Raw material/component | Weight percent |
|---|---|
| Primer PSA 1 (solids content 40 percent by weight) | 10.40 |
| Hardlen F6 P | 1.50 |
| Tyzor AA-95 | 0.50 |
| Geniosil GF 80 | 0.50 |
| Desmophen A 365 | 2.60 |
| Epikote 828 | 0.20 |
| Acetylacetone | 0.50 |
| Solvents | |
| Cyclohexane | 37.30 |
| Xylene | 19.70 |
| Ethylbenzene | 5.00 |
| Acetone | 7.00 |
| Petroleum | 3.70 |
| Isopropanol | 9.10 |
| Ethyl acetate | 2.00 |
| Total | 100.00 |

The primer was tested in the following combinations, giving the following results:

Example 15

Composition of the Primer:

| Raw material/component | Weight percent |
|---|---|
| Primer PSA 1 (solids content 40 percent by weight) | 10.40 |
| Hardlen F6 P | 1.50 |
| Tyzor NBZ | 0.50 |
| Geniosil GF 80 | 0.50 |
| Desmophen A 365 | 2.60 |
| Epikote 828 | 0.20 |
| Acetylacetone | 0.50 |
| Solvents | |
| Cyclohexane | 37.30 |
| Xylene | 19.70 |
| Ethylbenzene | 5.00 |
| Acetone | 7.00 |
| Petroleum | 3.70 |
| Isopropanol | 9.10 |
| Ethyl acetate | 2.00 |
| Total | 100.00 |

The primer was tested in the following combinations, giving the following results:

| Test adhesive tape | Substrate | Bonding force (300 mm/min) (N/cm) | | Bonding force after conditioned storage (N/cm) | |
|---|---|---|---|---|---|
| | | after 3 min | after 30 min | a) 2 wks. 85° C./ 85% rel. humidity | b) 2 wks. cycle |
| 3 (one-layer AC/SBS) | 1 (PP/EPDM smooth) | 61.7 (C) | 62.6 (C) | nd | nd |
| 3 | 2 (PP/EPDM ribbed) | 5.1 (C) | 5.8 (C) | 5.4 (C) | 5.2 (C) |
| 3 | 5 (PP) | 43.7 (50% C) | 48.3 (60% C) | 49.6 (60% C) | 40.1 (50% C) |
| 3 | 6 (hot-dip-galvanized steel) | 63.6 (C) | 66.8 (C) | 63.7 (C) | 65.6 (C) |

(C) = cohesive split of the adhesive tape (percentage relates to the cohesive proportion; no percentage = 100% C)
A = adhesive detachment of the adhesive tape from the primer or of the primer from the substrate
nd = not determined

| Test adhesive tape | Substrate | Bonding force (300 mm/min) (N/cm) | | Bonding force after conditioned storage (N/cm) | |
|---|---|---|---|---|---|
| | | after 3 min | after 30 min | a) 2 wks. 85° C./ 85% rel. humidity | b) 2 wks. cycle |
| 3 (one-layer AC/SBS) | 1 (PP/EPDM smooth) | 59.6 (C) | 61.7 (C) | nd | nd |
| 3 | 2 (PP/EPDM ribbed) | 5.9 (C) | 6.7 (C) | 6.2 (C) | 6.3 (C) |
| 3 | 5 (PP) | 53.6 (70% C) | 54.9 (70% C) | 55.9 (80% C) | 56.6 (90% C) |
| 3 | 6 (hot-dip-galvanized steel) | 61.2 (C) | 65.7 (C) | 60.6 (C) | 62.4 (C) |

(C) = cohesive split of the adhesive tape (percentage relates to the cohesive proportion; no percentage = 100% C)
A = adhesive detachment of the adhesive tape from the primer or of the primer from the substrate
nd = not determined

Example 16

Composition of the Primer:

| Raw material/component | Weight percent |
|---|---|
| Primer PSA 1 (solids content 40 percent by weight) | 10.40 |
| Hardlen F6 P | 1.50 |
| Tyzor TPT | 0.50 |
| Geniosil XL 10 | 0.50 |
| Desmophen A 365 | 2.60 |
| Epikote 828 | 0.20 |
| Acetylacetone | 0.50 |
| Solvents | |
| Cyclohexane | 37.30 |
| Xylene | 19.70 |
| Ethylbenzene | 5.00 |
| Acetone | 7.00 |
| Petroleum | 3.70 |
| Isopropanol | 9.10 |
| Ethyl acetate | 2.00 |
| Total | 100.00 |

The primer was tested in the following combinations, giving the following results:

| Test adhesive tape | Substrate | Bonding force (300 mm/min) (N/cm) | | Bonding force after conditioned storage (N/cm) | |
|---|---|---|---|---|---|
| | | after 3 min | after 30 min | a) 2 wks. 85° C./ 85% rel. humidity | b) 2 wks. cycle |
| 3 (one-layer AC/SBS) | 1 (PP/EPDM smooth) | 62.7 (C) | 65.6 (C) | nd | nd |
| 3 | 2 (PP/EPDM ribbed) | 6.5 (C) | 6.9 (C) | 6.4 (C) | 6.8 (C) |
| 3 | 5 (PP) | 55.7 (80% C) | 57.6 (90% C) | 58.6 (90% C) | 56.3 (80% C) |
| 3 | 6 (hot-dip-galvanized steel) | 65.1 (C) | 63.6 (C) | 62.3 (C) | 65.1 (C) |

(C) = cohesive split of the adhesive tape (percentage relates to the cohesive proportion; no percentage = 100% C)
A = adhesive detachment of the adhesive tape from the primer or of the primer from the substrate
nd = not determined

Comparative Example 1

Composition of the Comparative Primer:

| Raw material/component | Weight percent |
|---|---|
| Primer PSA 4 (solids content 40 percent by weight) | 10.40 |
| Hardlen DX 526 P | 1.50 |
| Tyzor TPT | 0.50 |
| Solvents | |
| Cyclohexane | 41.10 |
| Xylene | 19.70 |
| Ethylbenzene | 5.00 |
| Acetone | 7.00 |
| Petroleum | 3.70 |
| Isopropanol | 9.10 |
| Ethyl acetate | 2.00 |
| Total | 100.00 |

The comparative primer was tested in the following combinations, giving the following results:

| Test adhesive tape | Substrate | Bonding force (300 mm/min) (N/cm) after 3 min | Bonding force (300 mm/min) (N/cm) after 30 min |
|---|---|---|---|
| 3 (one-layer AC/SBS) | 1 (PP/EPDM smooth) | 4.1 (A) | 5.2 (A) |
| 3 | 2 (PP/EPDM ribbed) | 1.7 (A) | 1.9 (A) |
| 3 | 5 (PP) | 5.6 (A) | 6.3 (A) |
| 3 | 6 (hot-dip-galvanized steel) | 5.4 (A) | 5.7 (A) |

C = cohesive split of the adhesive tape (percentage relates to the cohesive proportion; no percentage = 100% C)
(A) = adhesive detachment of the adhesive tape from the primer or of the primer from the substrate
nd = not determined

Comparative Example 2

Composition of the Comparative Primer:

| Raw material/component | Weight percent |
|---|---|
| Primer PSA 4 (solids content 40 percent by weight) | 10.40 |
| Hardlen F6 P | 1.50 |
| Tyzor TnBT | 0.50 |
| Solvents | |
| Cyclohexane | 41.10 |
| Xylene | 19.70 |
| Ethylbenzene | 5.00 |
| Acetone | 7.00 |
| Petroleum | 3.70 |
| Isopropanol | 9.10 |
| Ethyl acetate | 2.00 |
| Total | 100.00 |

The comparative primer was tested in the following combinations, giving the following results:

| Test adhesive tape | Substrate | Bonding force (300 mm/min) (N/cm) after 3 min | Bonding force (300 mm/min) (N/cm) after 30 min |
|---|---|---|---|
| 3 (one-layer AC/SBS) | 1 (PP/EPDM smooth) | 6.3 (A) | 7.6 (A) |
| 3 | 2 (PP/EPDM ribbed) | 1.5 (A) | 1.8 (A) |
| 3 | 5 (PP) | 4.9 (A) | 5.2 (A) |
| 3 | 6 (hot-dip-galvanized steel) | 5.1 (A) | 5.6 (A) |

C = cohesive split of the adhesive tape (percentage relates to the cohesive proportion; no percentage = 100% C)
(A) = adhesive detachment of the adhesive tape from the primer or of the primer from the substrate
nd = not determined

Example 17

Composition of the Primer:

| Raw material/component | Weight percent |
|---|---|
| Primer PSA 1 (solids content 40 percent by weight) | 10.40 |
| Hardlen DX 526 P | 1.50 |
| Tyzor TPT | 0.50 |
| Kraton ® D 1102 E | 0.50 |
| Solvents | |
| Cyclohexane | 40.60 |
| Xylene | 19.70 |
| Ethylbenzene | 5.00 |
| Acetone | 7.00 |
| Petroleum | 3.70 |
| Isopropanol | 9.10 |
| Ethyl acetate | 2.00 |
| Total | 100.00 |

The primer was tested in the following combinations, giving the following results:

| Test adhesive tape | Substrate | Bonding force (300 mm/min) (N/cm) after 3 min | Bonding force (300 mm/min) (N/cm) after 30 min | Bonding force (300 mm/min) (N/cm) after 24 hours |
|---|---|---|---|---|
| 1 (one-layer AC) | 1 (PP/EPDM smooth) | 21.4 (A) | 23.6 (A) | 24.1 (A) |
| 1 | 2 (PP/EPDM ribbed) | 2.3 (A) | 3.2 (A) | 3.7 (A) |
| 1 | 3 (PP/EPDM ribbed) | 2.2 (A) | 2.9 (A) | 3.0 (A) |
| 1 | 4 (PP/EPDM ribbed) | 2.4 (A) | 2.8 (A) | 3.0 (A) |
| 3 (one-layer AC/SBS) | 1 (PP/EPDM smooth) | 24.2 (A) | 25.8 (A) | 26.8 (A) |
| 3 | 2 (PP/EPDM ribbed) | 2.2 (A) | 2.6 (A) | 3.2 (A) |
| 3 | 3 (PP/EPDM ribbed) | 2.3 (A) | 3.1 (A) | 3.2 (A) |
| 3 | 4 (PP/EPDM ribbed) | 2.5 (A) | 3.3 (A) | 3.8 (A) |

C = cohesive split of the adhesive tape (percentage relates to the cohesive proportion; no percentage = 100% C)
(A) = adhesive detachment of the adhesive tape from the primer or of the primer from the substrate

Example 18

Composition of the Primer:

| Raw material/component | Weight percent |
|---|---|
| Primer PSA 1 (solids content 40 percent by weight) | 10.40 |
| Hardlen DX 526 P | 1.50 |
| Tyzor TPT | 0.50 |
| Kraton ® G 1652 E | 0.50 |
| Solvents | |
| Cyclohexane | 40.60 |
| Xylene | 19.70 |
| Ethylbenzene | 5.00 |
| Acetone | 7.00 |
| Petroleum | 3.70 |

-continued

| | Weight percent |
|---|---|
| Isopropanol | 9.10 |
| Ethyl acetate | 2.00 |
| Total | 100.00 |

The primer was tested in the following combinations, giving the following results:

| Test adhesive tape | Substrate | Bonding force (300 mm/min) (N/cm) | | |
|---|---|---|---|---|
| | | after 3 min | after 30 min | after 24 hours |
| 1 (one-layer AC) | 1 (PP/EPDM smooth) | 22.2 (A) | 23.8 (A) | 24.6 (A) |
| 1 | 2 (PP/EPDM ribbed) | 2.4 (A) | 2.6 (A) | 2.7 (A) |
| 1 | 3 (PP/EPDM ribbed) | 2.3 (A) | 2.9 (A) | 3.1 (A) |
| 1 | 4 (PP/EPDM ribbed) | 2.4 (A) | 2.6 (A) | 3.9 (A) |
| 3 (one-layer AC/SBS) | 1 (PP/EPDM smooth) | 23.9 (A) | 25.2 (A) | 25.8 (A) |
| 3 | 2 (PP/EPDM ribbed) | 2.4 (A) | 2.7 (A) | 3.0 (A) |
| 3 | 3 (PP/EPDM ribbed) | 2.4 (A) | 3.0 (A) | 3.1 (A) |
| 3 | 4 (PP/EPDM ribbed) | 2.5 (A) | 3.1 (A) | 3.5 (A) |

C = cohesive split of the adhesive tape (percentage relates to the cohesive proportion; no percentage = 100% C)
(A) = adhesive detachment of the adhesive tape from the primer or of the primer from the substrate Example 19

Composition of the Primer:

| Raw material/component | Weight percent |
|---|---|
| Primer PSA 1 (solids content 40 percent by weight) | 10.40 |
| Hardlen F6 P | 1.50 |
| Tyzor TPT | 0.50 |
| Kraton ® D 1102 E | 0.50 |
| Geniosil GF 80 | 0.50 |
| Desmophen A 365 | 2.60 |
| Epikote 828 | 0.20 |
| Acetylacetone | 0.50 |
| Tinopal OB | 0.15 |
| Solvents | |
| Cyclohexane | 36.65 |
| Xylene | 19.70 |
| Ethylbenzene | 5.00 |
| Acetone | 7.00 |
| Petroleum | 3.70 |
| Isopropanol | 9.10 |
| Ethyl acetate | 2.00 |
| Total | 100.00 |

The primer was tested in the following combinations, giving the following results:

| Test adhesive tape | Substrate | Bonding force (300 mm/min) (N/cm) | | |
|---|---|---|---|---|
| | | after 3 min | after 30 min | after 24 hours |
| 1 (one-layer AC) | 1 (PP/EPDM smooth) | 25.7 (A) | 28.2 (A) | 28.9 (A) |
| 1 | 2 (PP/EPDM ribbed) | 3.0 (A) | 3.3 (A) | 3.6 (A) |
| 1 | 3 (PP/EPDM ribbed) | 3.1 (A) | 3.2 (A) | 3.7 (A) |
| 1 | 4 (PP/EPDM ribbed) | 3.2 (A) | 3.8 (A) | 4.0 (A) |
| 3 (one-layer AC/SBS) | 1 (PP/EPDM smooth) | 24.9 (A) | 26.3 (A) | 26.9 (A) |
| 3 | 2 (PP/EPDM ribbed) | 2.6 (A) | 2.6 (A) | 3.1 (A) |
| 3 | 3 (PP/EPDM ribbed) | 2.7 (A) | 3.0 (A) | 3.2 (A) |
| 3 | 4 (PP/EPDM ribbed) | 2.9 (A) | 3.5 (A) | 3.9 (A) |

C = cohesive split of the adhesive tape (percentage relates to the cohesive proportion; no percentage = 100% C)
(A) = adhesive detachment of the adhesive tape from the primer or of the primer from the substrate
nd = not determined Example 20

Composition of the Primer:

| Raw material/component | Weight percent |
|---|---|
| Primer PSA 1 (solids content 40 percent by weight) | 10.40 |
| Hardlen F6 P | 1.50 |
| Tyzor TPT | 0.50 |
| Kraton ® G 1652 E | 0.50 |
| Geniosil GF 80 | 0.50 |
| Desmophen A 365 | 2.60 |
| Epikote 828 | 0.20 |
| Acetylacetone | 0.50 |
| Tinopal OB | 0.15 |
| Solvents | |
| Cyclohexane | 36.65 |
| Xylene | 19.70 |
| Ethylbenzene | 5.00 |
| Acetone | 7.00 |
| Petroleum | 3.70 |
| Isopropanol | 9.10 |
| Ethyl acetate | 2.00 |
| Total | 100.00 |

The primer was tested in the following combinations, giving the following results:

| Test adhesive tape | Substrate | Bonding force (300 mm/min) (N/cm) | | |
|---|---|---|---|---|
| | | after 3 min | after 30 min | after 24 hours |
| 1 (one-layer AC) | 1 (PP/EPDM smooth) | 25.3 (A) | 27.8 (A) | 27.9 (A) |
| 1 | 2 (PP/EPDM ribbed) | 2.0 (A) | 3.6 (A) | 3.8 (A) |
| 1 | 3 (PP/EPDM ribbed) | 2.9 (A) | 2.9 (A) | 3.2 (A) |

-continued

| Test adhesive tape | Substrate | Bonding force (300 mm/min) (N/cm) | | |
|---|---|---|---|---|
| | | after 3 min | after 30 min | after 24 hours |
| 1 | 4 (PP/EPDM ribbed) | 2.6 (A) | 2.9 (A) | 3.6 (A) |
| 3 (one-layer AC/SBS) | 1 (PP/EPDM smooth) | 25.1 (A) | 26.7 (A) | 27.8 (A) |
| 3 | 2 (PP/EPDM ribbed) | 2.4 (A) | 2.9 (A) | 3.6 (A) |
| 3 | 3 (PP/EPDM ribbed) | 2.6 (A) | 3.0 (A) | 3.1 (A) |
| 3 | 4 (PP/EPDM ribbed) | 2.1 (A) | 2.3 (A) | 3.0 (A) |

C = cohesive split of the adhesive tape (percentage relates to the cohesive proportion; no percentage = 100% C)
(A) = adhesive detachment of the adhesive tape from the primer or of the primer from the substrate
nd = not determined The primer was tested in the following combinations, giving the following results:

| Test adhesive tape | Substrate | Bonding force (300 mm/min) (N/cm) | | |
|---|---|---|---|---|
| | | after 3 min | after 30 min | after 24 hours |
| 1 (one-layer AC) | 1 (PP/EPDM smooth) | 25.3 (A) | 27.8 (A) | 27.9 (A) |
| 1 | 2 (PP/EPDM ribbed) | 2.0 (A) | 3.6 (A) | 3.8 (A) |
| 1 | 3 (PP/EPDM ribbed) | 2.9 (A) | 2.9 (A) | 3.2 (A) |
| 1 | 4 (PP/EPDM ribbed) | 2.6 (A) | 2.9 (A) | 3.6 (A) |
| 3 (one-layer AC/SBS) | 1 (PP/EPDM smooth) | 25.1 (A) | 26.7 (A) | 27.8 (A) |
| 3 | 2 (PP/EPDM ribbed) | 2.4 (A) | 2.9 (A) | 3.6 (A) |
| 3 | 3 (PP/EPDM ribbed) | 2.6 (A) | 3.0 (A) | 3.1 (A) |
| 3 | 4 (PP/EPDM ribbed) | 2.1 (A) | 2.3 (A) | 3.0 (A) |

C = cohesive split of the adhesive tape (percentage relates to the cohesive proportion; no percentage = 100% C)
(A) = adhesive detachment of the adhesive tape from the primer or of the primer from the substrate
nd = not determined

The invention claimed is:

1. Primer comprising a mixture, in dispersion in one or more dispersants or in solution in one or more solvents, comprising:
   at least one copolymer obtained by copolymerizing a monomer mixture comprising:
      at least 20 wt % vinylcaprolactam, vinylpyrrolidone, or vinylcaprolactam and vinylpyrrolidone;
      one or more acrylic esters of a linear primary alcohol, one or more acrylic esters of a branched acyclic alcohol, or one or more acrylic esters of a linear primary alcohol and one or more acrylic esters of a branched acyclic alcohol;
   at least one chlorinated polyolefin; and
   at least one metal compound selected from the group consisting of a metal acetylacetonate, a metal alkoxide, and an alkoxy metal acetylacetonate,
wherein:
   the total amount of, when present, the vinylcaprolactam, the vinylpyrrolidone, the acrylic esters of a linear primary alcohol, and the one or more acrylic esters of a branched acyclic alcohol in the monomer mixture is at least 90 wt % based on the total weight of the monomer mixture;
   the linear primary alcohol comprises 2 to 10 carbon atoms in a first alkyl radical;
   the branched acyclic alcohol comprises 3 to 12 carbon atoms in a second alkyl radical; and
   the monomer mixture comprises at most 1 wt % acrylic acid based on the total weight of the monomer mixture.

2. Primer according to claim 1, wherein the at least one copolymer is a pressure-sensitive adhesive.

3. Primer according to claim 1, wherein the total amount of vinylcaprolactam, the vinylpyrrolidone, or the vinylcaprolactam and the vinylpyrrolidone in the monomer mixture is at most 50 wt % based on the total weight of the monomer mixture.

4. Primer according to claim 1, wherein the monomer mixture further comprises n-butyl acrylate.

5. Primer according to claim 1, wherein a metal in the at least one metal compound is selected from the group consisting of titanium, aluminium, zirconium, zinc, and iron.

6. Primer according to claim 1, wherein the concentration of the copolymer, based on the total weight of the primer, is from 1 wt % to 30 wt %.

7. Primer according to claim 1, wherein the at least one chlorinated polyolefin has been modified with an α,β-unsaturated carboxylic acid, with an anhydride thereof, or with an acrylate.

8. Primer according to claim 1, wherein the primer is free of block copolymers of the polystyrene/polydiene or polystyrene/hydrogenated polydiene type.

9. Primer according to claim 1, wherein the primer further comprises at least one organofunctional silane of Formula (I)

$$(R^1O-)_x Si(R^2)_y (R^3)_z \quad \text{Formula (I)}$$

in which:
   x=1, 2 or 3;
   when x=1, $R^1$ is a $C_1$-$C_4$ alkyl radical, a $C_2$-$C_6$ alkoxyalkyl radical, or an acyl radical;
   when x=2 or 3, $R^1$ are each independently a $C_1$-$C_4$ alkyl radical, a $C_2$-$C_6$ alkoxyalkyl radical, or an acyl radical;
   y=0 or 1;
   when y=1, $R^2$ is an aminoalkyl radical, a vinyl group, a methacryloyloxyalkyl radical, an isocyanatoalkyl radical, an O-methylcarbamatoalkyl radical, a glycidoxyalkyl radical, or a phenyl radical;
   z=4−x−y; and
   when z=2 or 3, $R^3$ are each independently a $C_1$-$C_{18}$ alkyl radical.

10. Primer according to claim 1, wherein the primer further comprises one or more epoxy resins.

11. Primer according to claim 1, wherein the primer further comprises one or more styrene-acrylate resins.

12. Primer according to claim 1, wherein the primer further comprises acetylacetone.

13. Primer according to claim 1, wherein the primer further comprises one or more fluorescent optical brighteners.

14. Method for producing an adhesion-promoting layer on a substrate, comprising:
   applying the primer of claim 1, in dispersion in one or more dispersants or in solution in one or more solvents, to a substrate; and
   removing the one or more dispersants or the one or more solvents.

15. Primer according to claim 1, wherein the monomer mixture is free of acrylic acid.

* * * * *